(12) United States Patent
May et al.

(10) Patent No.: US 6,579,218 B1
(45) Date of Patent: Jun. 17, 2003

(54) CENTRIFUGAL FILTER UTILIZING A PARTIAL VACUUM CONDITION TO EFFECT REDUCED AIR DRAG ON THE CENTRIFUGE ROTOR

(75) Inventors: David F. May, Columbus, IN (US); Louis A. Krempel, Columbus, IN (US); Steven J. Merritt, Kearney, NE (US)

(73) Assignee: Analytical Engineering, Inc., Columbus, IN (US)

( * ) Notice: Subject to any disclaimer, the term of this patent is extended or adjusted under 35 U.S.C. 154(b) by 0 days.

(21) Appl. No.: 09/655,583

(22) Filed: Sep. 6, 2000

Related U.S. Application Data

(63) Continuation-in-part of application No. 09/420,161, filed on Oct. 18, 1999, now Pat. No. 6,261,455, and a continuation-in-part of application No. 09/420,162, filed on Oct. 18, 1999, now Pat. No. 6,296,765, and a continuation-in-part of application No. 09/352,294, filed on Jul. 12, 1999, now Pat. No. 6,213,929, which is a continuation-in-part of application No. 09/176,689, filed on Oct. 21, 1998, now Pat. No. 6,210,311.

(60) Provisional application No. 60/141,465, filed on Jun. 29, 1999, provisional application No. 60/112,231, filed on Dec. 15, 1998, provisional application No. 60/108,830, filed on Nov. 18, 1998, provisional application No. 60/105,135, filed on Oct. 21, 1998, and provisional application No. 60/101,804, filed on Sep. 25, 1998.

(51) Int. Cl.[7] .............................. B01D 21/26; B04B 1/04

(52) U.S. Cl. ............................. 494/24; 494/49; 494/62; 494/84; 184/6.24

(58) Field of Search ............................. 494/24, 43, 49, 494/62, 84; 210/168, 360.1, 380.1; 184/6.24

(56) References Cited

U.S. PATENT DOCUMENTS 2,053,856 A 9/1936 Weidenbacker
2,129,992 A 9/1938 De Mattia
2,256,951 A 9/1941 Van Riel
2,321,144 A 6/1943 Jones (List continued on next page.)

FOREIGN PATENT DOCUMENTS

| GB | 1089355 | | 9/1965 |
|---|---|---|---|
| SU | 362643 | | 7/1969 |
| SU | 869822 | | 12/1974 |
| SU | 564884 | | 7/1977 |
| SU | 1409330 A1 | * | 9/1985 |
| WO | 83/02406 | | 1/1982 |
| WO | 96/21511 | * | 7/1996 |

OTHER PUBLICATIONS

Translation from Russian of SU 1409330–A1, pp. 1–3.*

Primary Examiner—David A. Reifsnyder
(74) Attorney, Agent, or Firm—Taylor & Aust, P.C.

(57) ABSTRACT

A centrifuge filter for removing soot from engine oil. The centrifuge filter includes a rotor adapted to be rotated inside a centrifuge housing by an electric motor or other means. The rotor preferably includes a reusable aluminum support casing and a disposable plastic cartridge. The plastic cartridge includes a trap with partition walls to prevent wave formation in the rotating liquid contained in the trap. The cartridge includes an annular inlet through its top end, a winding flow path through the cartridge and an outlet at the bottom enc. The centrifuge housing includes an isolated sealed rotor chamber. Using the venturi effect, air is evacuated from the rotor chamber to provide a partial vacuum to reduce air drag on the rotor. Resilient rubber vibration isolators are used to reduce vibrations and engine induced shock loads from reaching the rotating element. A side oil inlet is provided in the cartridge to receive unfiltered oil at a location offset from the axis of rotation. Oil is feed in through the top of the centrifuge cartridge and discharged out the bottom. The rotor is carried by bearings on a stationary central support shaft. Maintenance is performed through a removable lid on the top end of the rotor. A restriction plug is used to control flow into the rotor.

27 Claims, 24 Drawing Sheets

U.S. PATENT DOCUMENTS

| | | |
|---|---|---|
| 2,335,420 A | 11/1943 | Jones |
| 2,485,390 A | 10/1949 | Langmuir |
| 2,647,686 A | 8/1953 | Drury |
| 2,745,217 A | 5/1956 | Gold et al. |
| 3,007,629 A | 11/1961 | Boyland |
| 3,223,315 A | 12/1965 | Smith |
| 3,228,597 A | 1/1966 | Walker et al. |
| 3,273,324 A | 9/1966 | Jennings |
| 3,335,946 A | 8/1967 | Putterlik |
| 3,403,848 A | 10/1968 | Windsor et al. |
| 3,430,853 A | 3/1969 | Kirk et al. |
| 3,432,091 A | 3/1969 | Beazley |
| 3,762,633 A | 10/1973 | Ishii |
| 3,784,092 A | 1/1974 | Gibson |
| 3,791,576 A | 2/1974 | Bazil |
| 3,879,294 A | 4/1975 | Ellis et al. |
| 3,971,508 A * | 7/1976 | Giangiulio ............ 494/1 |
| 4,106,689 A | 8/1978 | Kozulla |
| 4,142,671 A | 3/1979 | Irvin et al. |
| 4,150,580 A | 4/1979 | Silkebakken et al. |
| 4,165,032 A | 8/1979 | Klingenberg |
| 4,221,323 A | 9/1980 | Courtot |
| 4,288,030 A | 9/1981 | Beazley et al. |
| 4,492,631 A | 1/1985 | Martin |
| 4,498,898 A | 2/1985 | Haggett |
| 4,547,185 A | 10/1985 | Hellekant |
| 4,557,831 A | 12/1985 | Lindsay et al. |
| 4,891,041 A | 1/1990 | Hohmann et al. |
| 5,085,783 A | 2/1992 | Feke et al. |
| 5,096,581 A | 3/1992 | Purvey |
| 5,364,335 A | 11/1994 | Franzen et al. |
| 5,494,579 A | 2/1996 | Robatel et al. |
| 5,637,217 A | 6/1997 | Herman et al. |
| 5,656,164 A | 8/1997 | Vado et al. |
| 5,707,519 A | 1/1998 | Miller et al. |
| 5,779,618 A | 7/1998 | Onodera et al. |
| 5,785,849 A | 7/1998 | Mules |
| 6,017,300 A | 1/2000 | Herman |
| 6,019,717 A | 2/2000 | Herman |
| 6,210,311 B1 * | 4/2001 | May ............... 494/24 |
| 6,213,929 B1 * | 4/2001 | May ............... 494/24 |
| 6,261,455 B1 * | 7/2001 | Brown et al. ......... 210/380.1 |
| 6,296,765 B1 * | 10/2001 | Brown et al. ......... 210/380.1 |

\* cited by examiner

FIG. 14
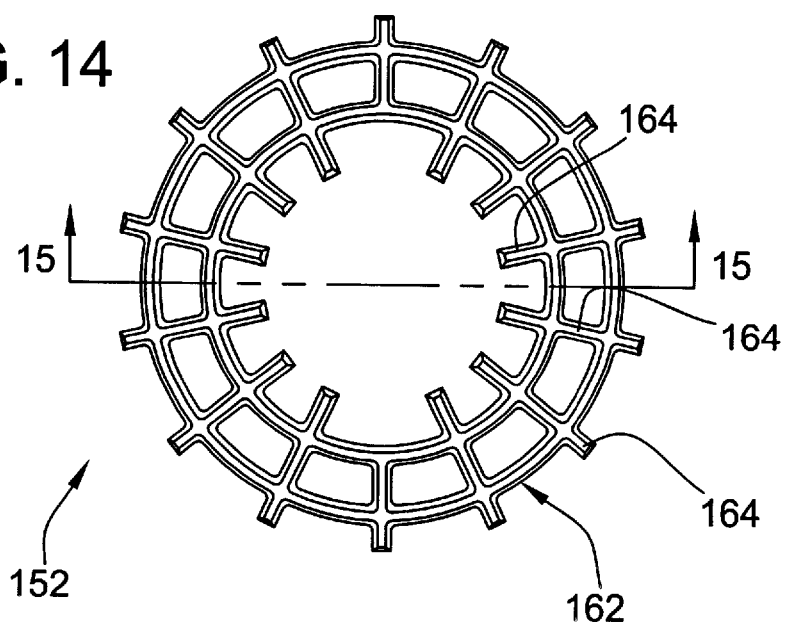
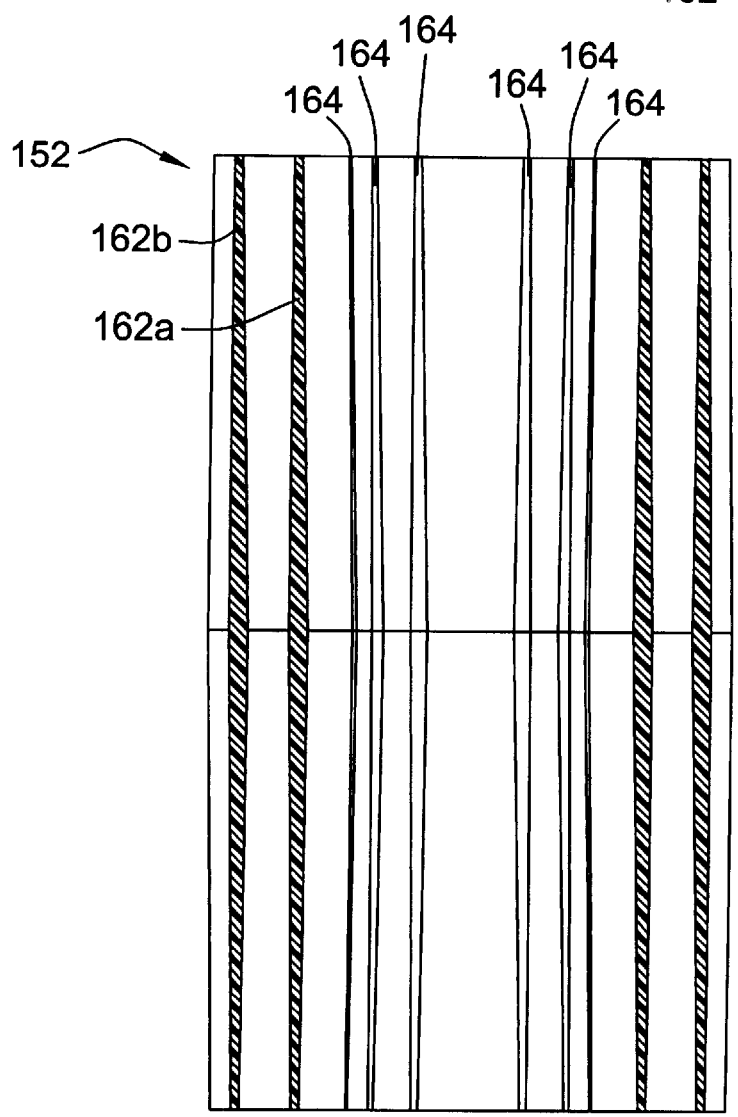
FIG. 15

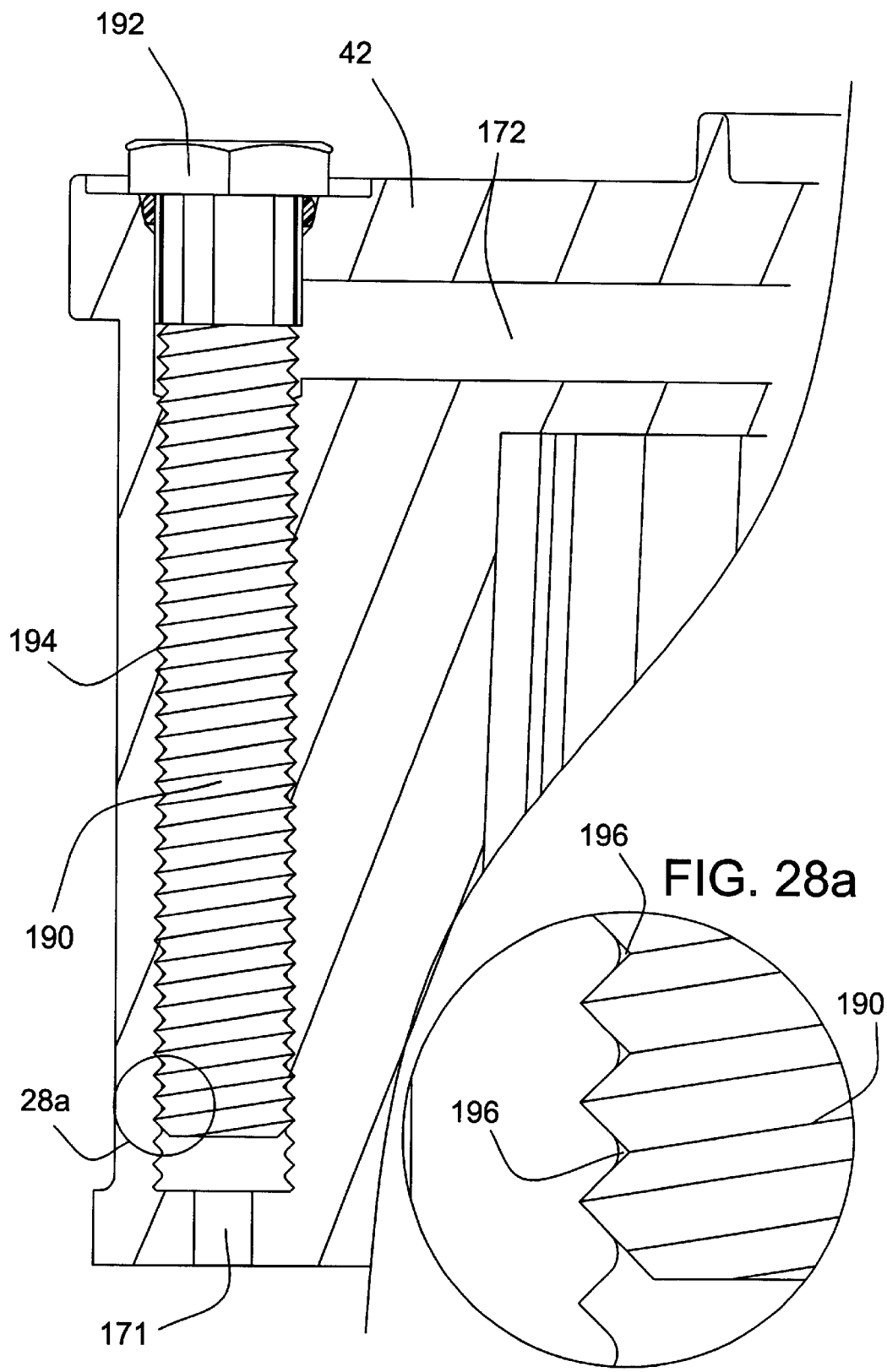

FIG. 35
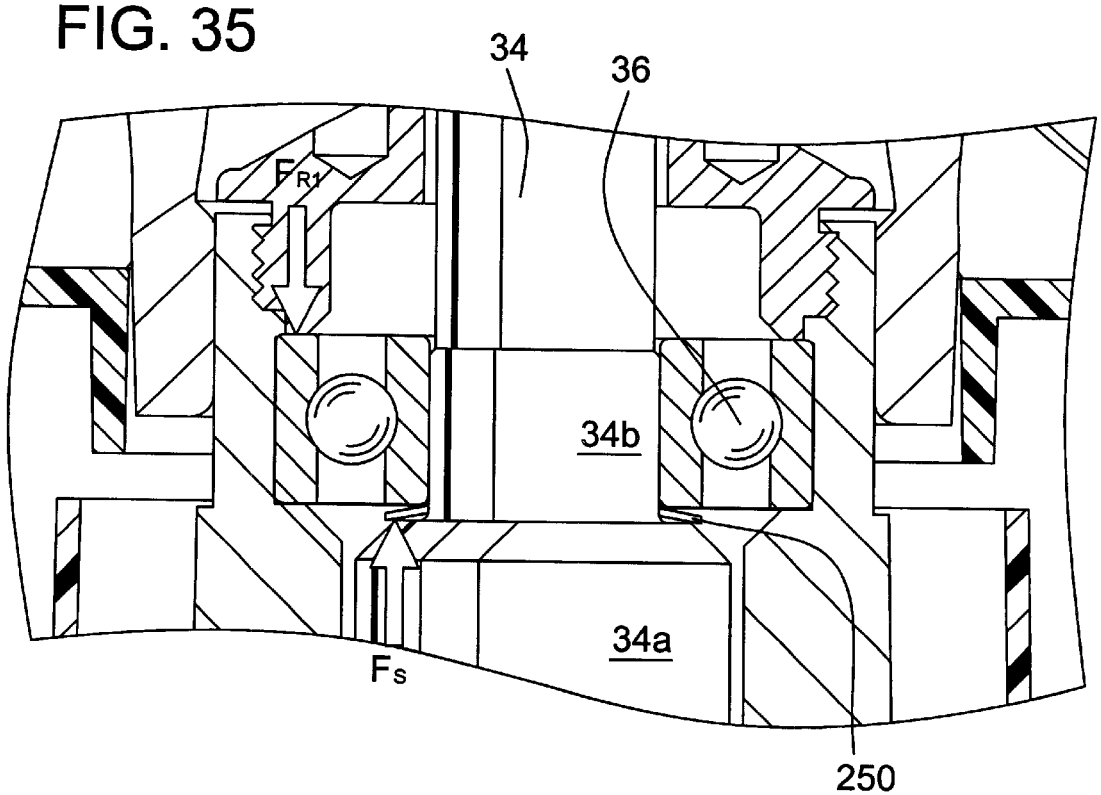
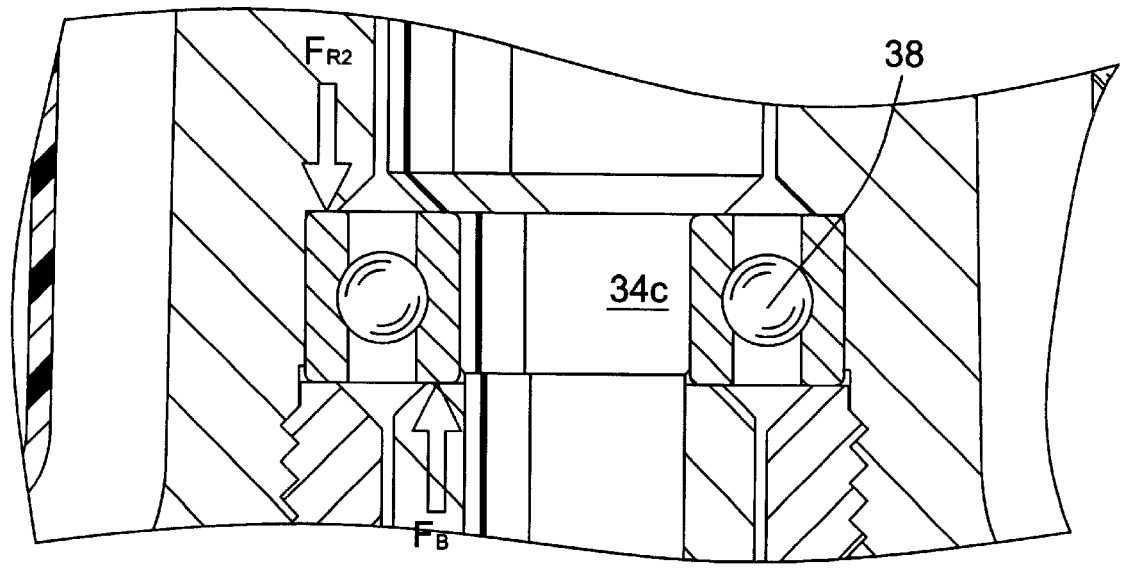

CENTRIFUGAL FILTER UTILIZING A PARTIAL VACUUM CONDITION TO EFFECT REDUCED AIR DRAG ON THE CENTRIFUGE ROTOR

RELATED APPLICATIONS

This is a continuation-in-part patent application based upon U.S. Non-Provisional Patent Application Ser. Nos. 09/420,161 and 09/420,162, entitled "Centrifuge Cartridge for Removing Soot from Oil in Vehicle Engine Applications", and "Centrifuge Housing for Receiving Centrifuge Cartridge and Method of Removing Soot from Engine Oil" now U.S. Pat. Nos. 6,261,455 and 6,296,765 respectively, both of which were filed on Oct. 18, 1999 and both of which claim the benefit of U.S. Provisional Application Ser. Nos. 60/105,135, filed on Oct. 21, 1998; 60/112,231, filed on Dec. 15, 1998; and 60/141,465, filed on Jun. 29, 1999. This is also a continuation-in-part patent application based on U.S. Non-provisional Patent Application Ser. No. 09/352,294 entitled "Centrifugal Filter" and which was filed on Jul. 12, 1999, now U.S. Pat. No. 6,213,929 and which claims the benefit of U.S. Provisional Application Ser. No. 60/108,830, entitled "Electric Motor Driven Centrifugal Filter", filed Nov. 18, 1998, which is also a continuation in part of U.S. patent application Ser. No. 09/176,689, entitled "Centrifugal Filter and Method of Operating Same", filed on Oct. 21, 1998 now U.S. Pat. No. 6,210,311, which is a non-provisional patent application based upon U.S. Provision Patent Application Ser. No. 60/101,804, entitled "Auxiliary Powered Centrifugal Filter", filed Sep. 25, 1998. The disclosure of each of the above identified provisional and non-provisional patent applications are hereby incorporated by reference in their entireties.

FIELD OF THE INVENTION

The present invention generally relates to centrifugal separators and more particularly relates to centrifugal oil filters for engine and vehicle applications.

BACKGROUND OF THE INVENTION

Current heavy-duty diesel engines put a moderate amount of soot (a form of unburned fuel) into the oil pan. This soot is generated due to the fuel hitting the cold cylinder walls and then being scraped down into the oil sump when the pistons reciprocate in the cylinders. Up until recently, the nitrous oxide emission regulations in the United States and other countries have been high enough that the fuel injection timing could be such that the level of soot generated was not high. In typical applications, the soot level would be under 1% (by weight) of the engine oil at oil drain time. At these low levels, soot in the oil does not cause any significant wear problems.

Recently, there has been a move to significantly lower nitrous oxide emissions which requires much retarded fuel injection timing, which significantly increases the amount of soot being generated. At reasonable oil drain intervals, the soot level may be as high as 4 or 5% with retarded injection timing. When the soot level gets this high, lubrication at critical wear points on the engine becomes so poor that high wear results, significantly decreasing the miles to overhaul and causing high operator expense.

Thus, the engine manufacturer has two choices, suffer very high warranty costs and low miles to overhaul, or significantly lower oil drain intervals to keep high soot levels out of the oil. Neither of these choices is desirable, so there is a current strong need to have a means of getting the soot out of the oil, the subject of this invention.

A problem with removing the soot from oil is that it is very small in size—around 0.1 to 2.0 micrometers. To remove such small particles from oil using barrier filtration is not feasible due to the large filter size required and the very high probability that the filter will become plugged very rapidly due to trying to filter to such a fine level.

One way that is feasible to remove the soot from the oil is by using a centrifuge, a device that removes the soot from the oil using centrifugal force. This type of device is used to separate blood constituents from blood and has many other applications in typical laboratory applications. The use of a centrifuge for an engine brings a requirement of doing it in a very inexpensive and reliable manner with the centrifuge being easily changed at oil change time. Heretofore, centrifugal filters have not been able to sufficiently remove soot from oil, sufficiently retain the soot, nor reliable enough for use in engine and vehicle applications.

SUMMARY OF THE INVENTION

In view of the foregoing, a primary objective of the present invention is to provide a practical and reliable centrifuge filter for filtering soot from engine oil in vehicle applications.

In that regard, it is an object of the present invention to drive a centrifuge rotor at sufficient speed using existing power supplies of a vehicle, and which also minimizes powering requirements.

In that regard, it is a further object of the present invention to provide adequate residence time and centrifugal force sufficient to filter soot from the oil.

In accordance with these and other objectives, the present invention is directed toward a novel centrifuge housing mounted in a vehicle and connected to the oil system of the vehicle's engine in which air is evacuated from the rotor chamber to reduce the air drag on the rotor (and increase rotor speed or reduce power requirements). The centrifuge housing includes a sealed centrifuge rotor chamber providing an isolated environment in which the centrifuge rotor is supported for rotation. The housing has an inlet port connected to the engine to receive oil and an outlet port connected to the engine to return oil to the engine. To effect the partial vacuum in the rotor chamber, a venturi conduit is interposed between the inlet port and the outlet port. The venturi conduit has operatively larger and smaller flow capacity passage portions adapted to create suction via the venturi effect. The isolated atmosphere is fluidically connected to the venturi conduit wherein the suction creates a partial vacuum in the isolated environment of the sealed centrifuge rotor chamber for reduced air drag on the centrifuge rotor during rotation.

The present invention is also directed toward a novel method of centrifugally filtering soot from oil in an engine of a vehicle. The method comprises sealing the centrifuge rotor chamber to provide an isolated atmosphere in which the centrifuge rotates, rotating a centrifuge rotor inside a centrifuge housing to remove soot from oil, and evacuating air in the isolated atmosphere to provide a partial vacuum reducing air drag on the centrifuge rotor.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

(FIG. 10 taken about line 10—10)

FIGS. 14–16 are end, cross section, and isometric views of the inserted trap of the disposable centrifuge cartridge, respectively. (FIG. 15 taken about line 15—15)

(FIG. 18 taken about line 18—18)

FIG. 28 is an enlarged fragmentary view of FIG. 27.

FIG. 28a is an enlarged view of a portion of FIG. 28.

FIG. 35 is an enlarged fragmentary view of a portion of the centrifuge schematically illustrating the loads on the bearings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
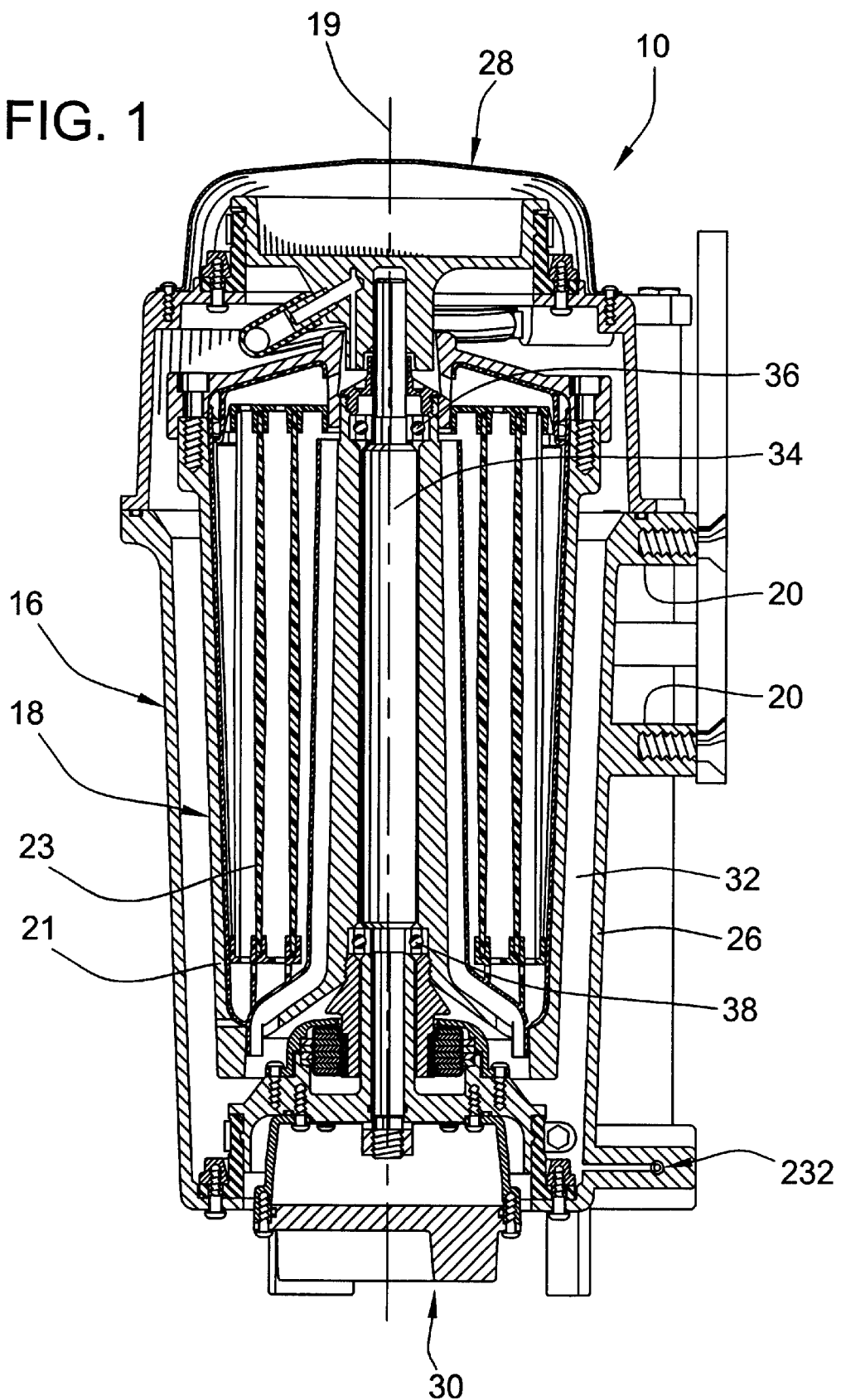
FIG. 1 is a cross section of a centrifuge filter including a centrifuge housing and a centrifuge cartridge for removing soot from oil according to a preferred embodiment of the present invention.
Figure 25:
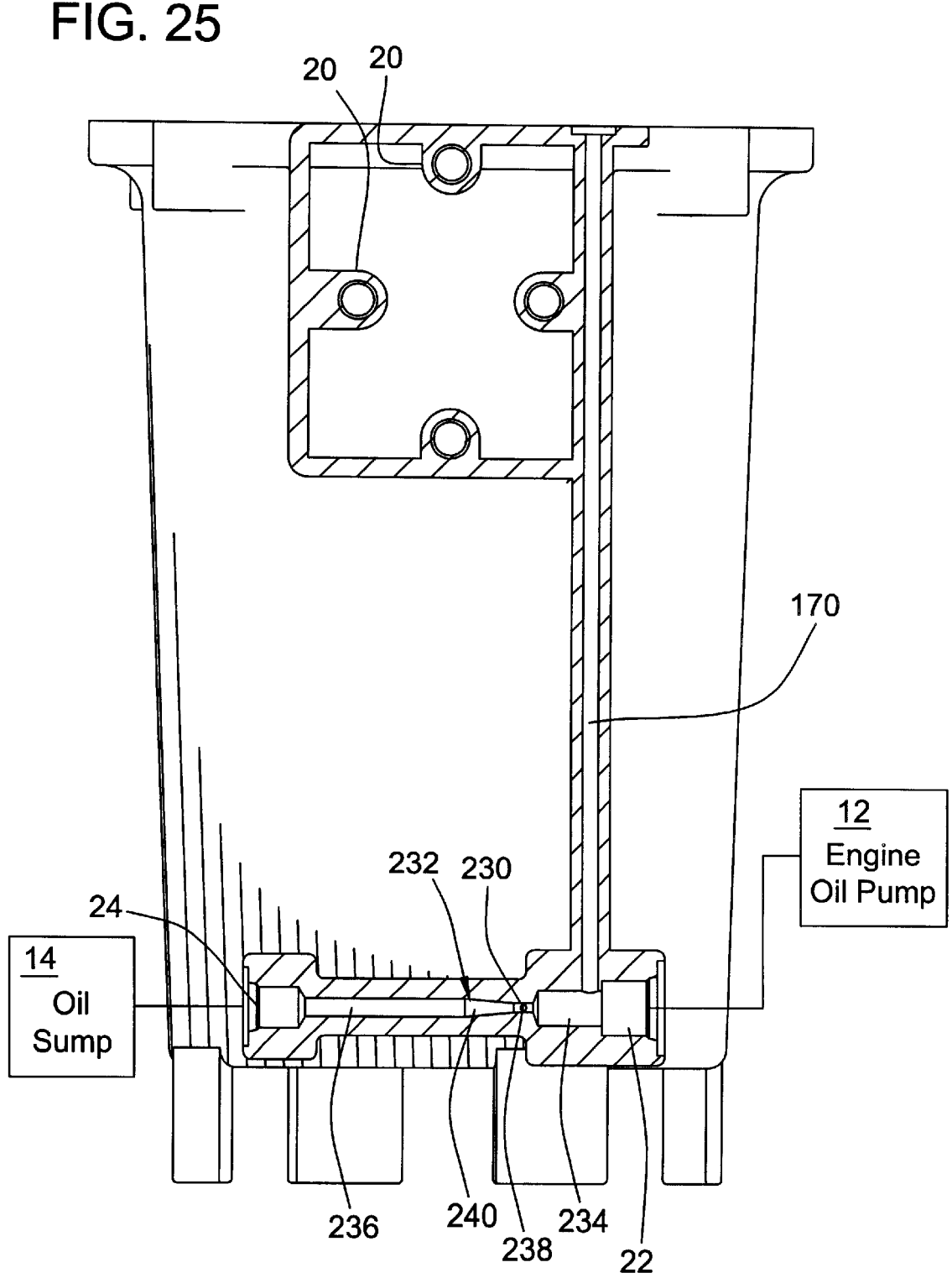
FIG. 25 is a cross section of FIG. 24 shown schematically connected with the oil pump and oil sump of an engine.
Figure 26:
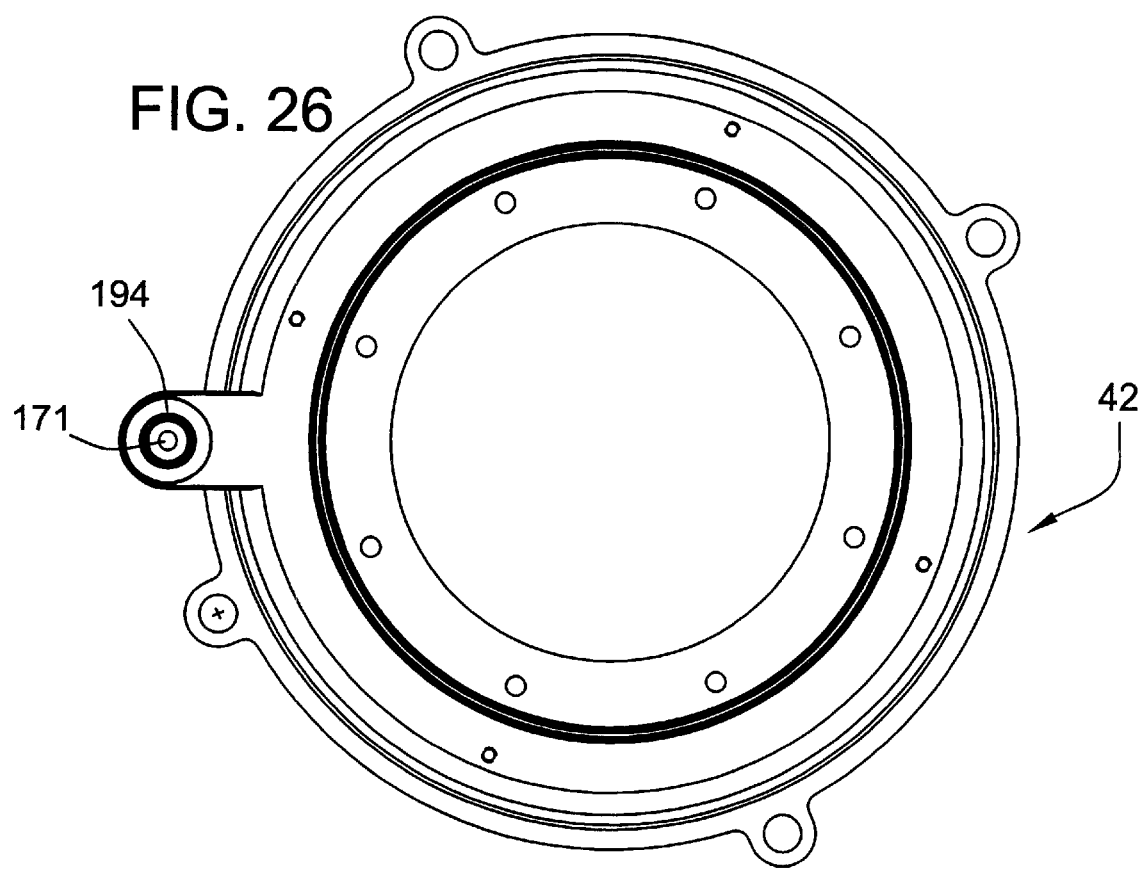
FIG. 26 is a top end view of the lid adapted to mount to support body of the centrifuge housing.
Figure 27:
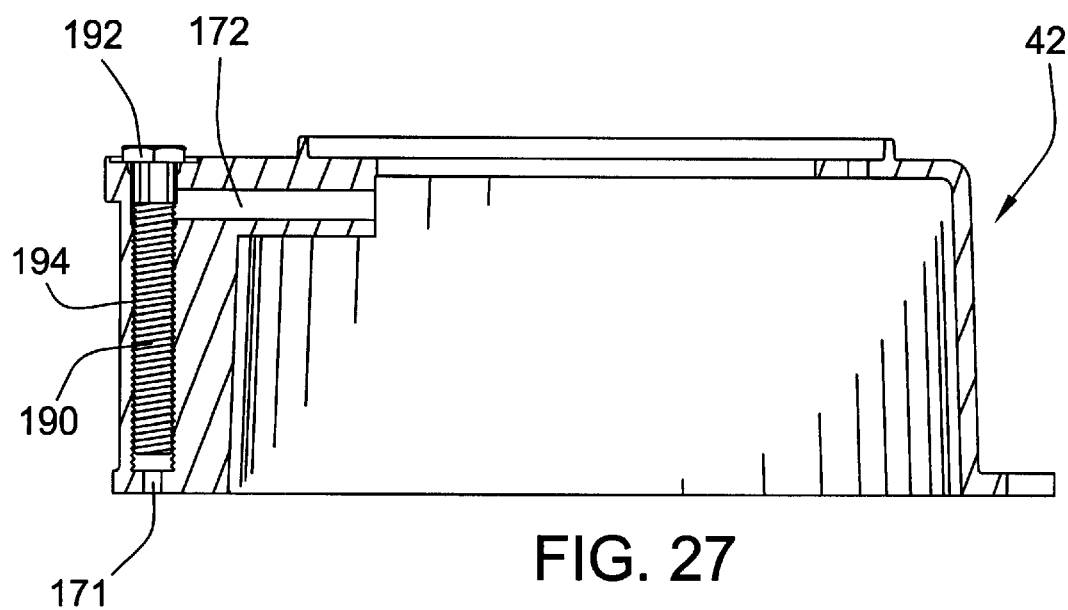
FIG. 27 is a cross section of FIG. 26, illustrated with the restriction plug inserted.

For purposes of illustration, a preferred embodiment of the present invention has been illustrated as a centrifuge 10 adapted to separate soot from engine oil utilizing centrifugal force. Although the particular centrifuge 10 is illustrated for soot removing applications for vehicles, it should be understood that there may be other applications for certain aspects of invention and as such, attention should be had to the appended claims to determine the patent coverage afforded hereby. Referring to FIG. 1, the centrifuge 10 includes a stationary centrifuge housing 16 supporting a rotor 18 for rotation about a predetermined axis 19. The centrifuge housing 16 includes a mount 20 that is adapted to mount and fix the centrifuge 10 to the vehicle frame or engine of the vehicle. When mounted to a vehicle and connected to the engine thereof as schematically indicated in FIG. 25, the centrifuge housing 16 includes an inlet port 22 connected to the engine oil pump 12 to receive pressurized oil and an outlet port 24 connected the engine oil sump 14 for return of oil. The centrifuge housing 16 is operable to feed unfiltered oil into the rotor 18, collect filtered oil from the rotor 18 and return the collected filtered oil. The rotor 18 is generally that portion of the centrifuge 10 that rotates to facilitate soot separation from oil. In the preferred embodiment, the rotor 18 includes a reusable support casing 21 structurally comprised of die cast aluminum and a disposable plastic cartridge 23 inserted inside the casing 21 for trapping contaminant for removal.

Figure 2:
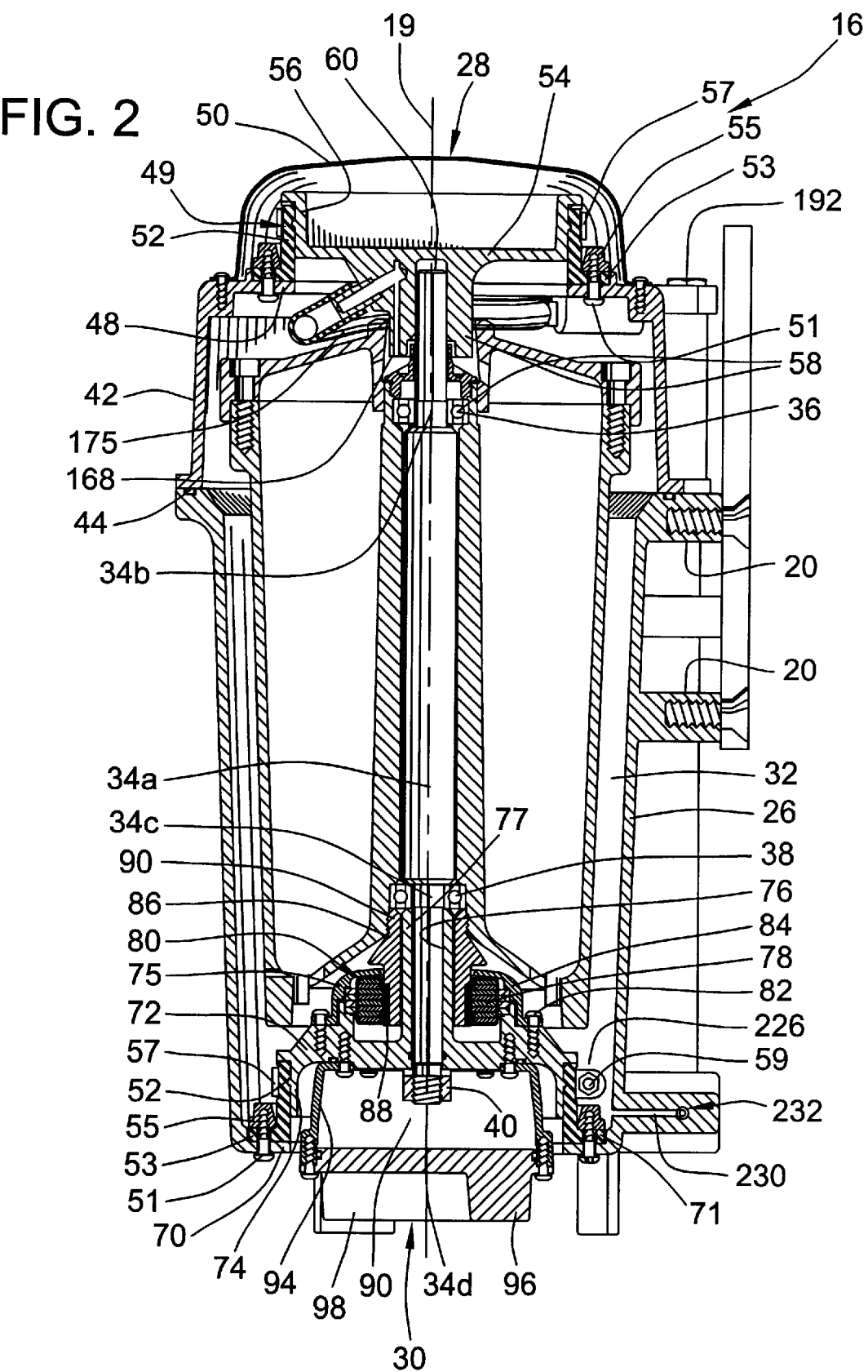
FIG. 2 is a cross section of the cartridge housing shown in FIG. 1, with the cartridge removed.
Figure 5:
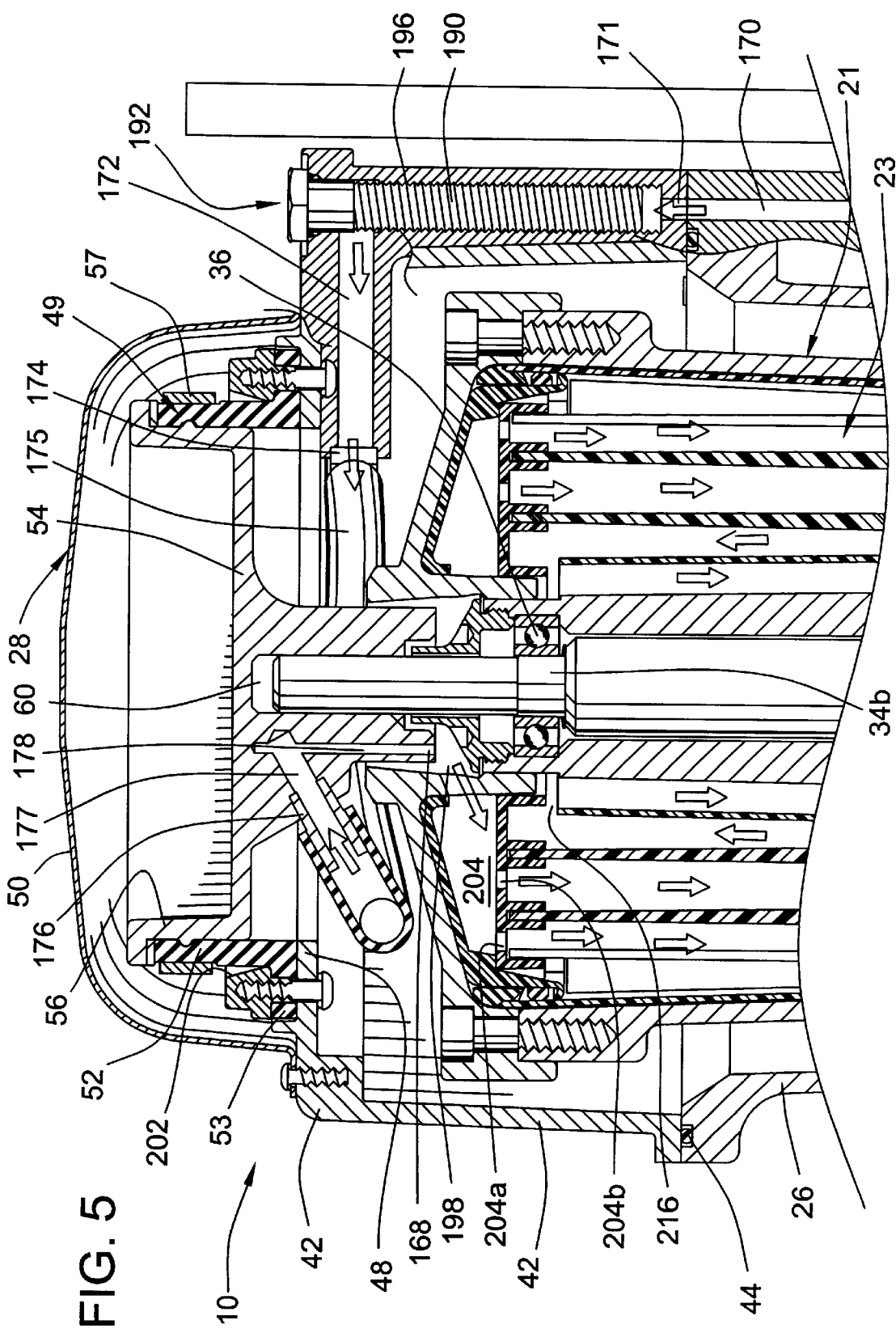
FIG. 5 is an enlarged fragmented view of a top portion of FIG. 1 with a portion being fragmented to better illustrate the oil flow path.
Figure 6:
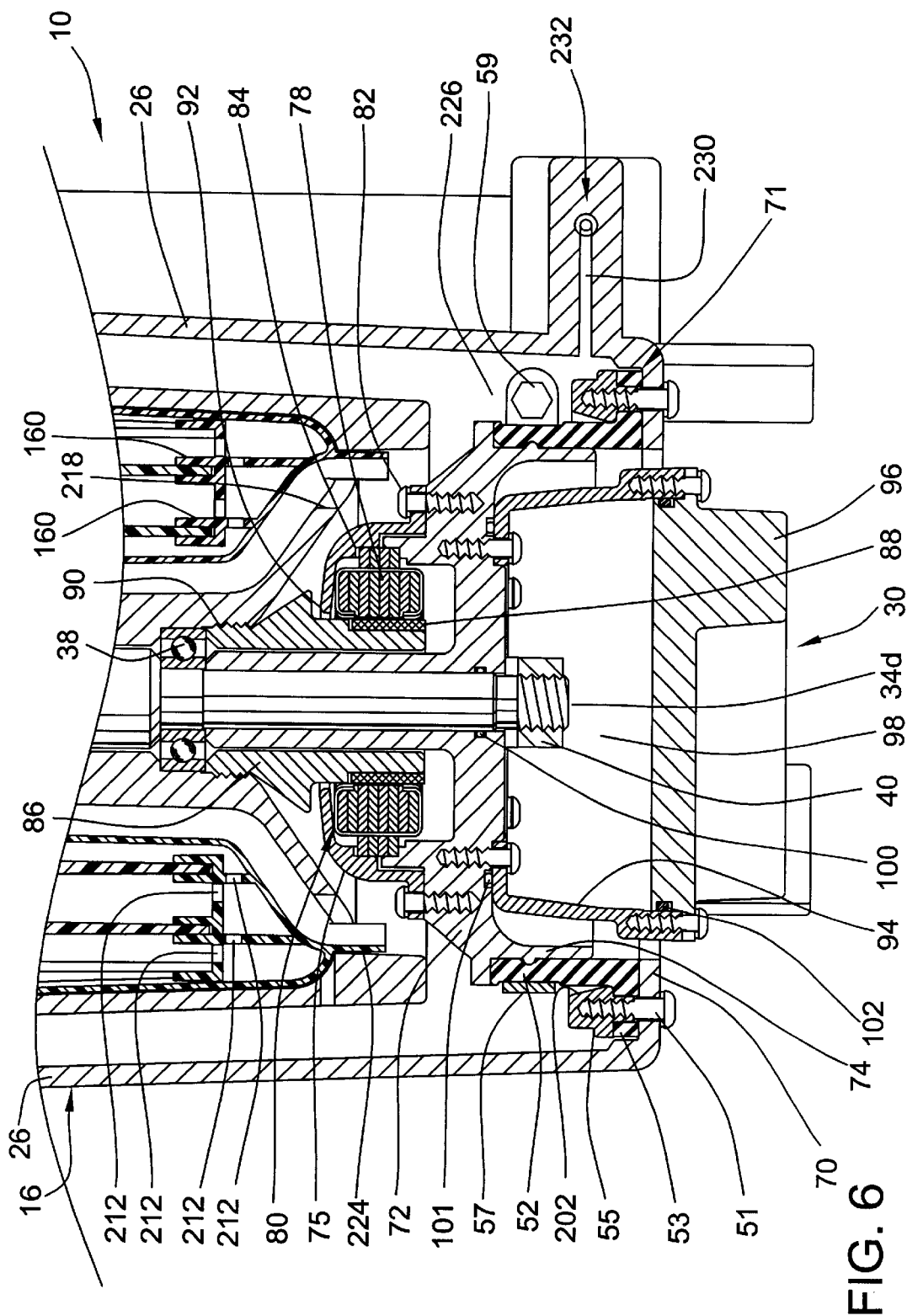
FIG. 6 is an enlarged fragmented view of a bottom portion of FIG. 1.

Referring to FIGS. 2, 5–6, the centrifuge housing 16 includes a hollow or tubular primary support body 26 formed of die cast aluminum having threaded projecting bosses 20 to facilitate mounting of the centrifuge 10 to a vehicle frame, a lid assembly 28 enclosing a top end of the support body 26, and a motor mount assembly 30 enclosing a bottom end of the support body 26. The support body 26 in combination with the lid assembly 28 and the motor mount assembly 30 define an internal rotor chamber 32 in which the rotor 18 is mounted for rotation. To support the rotor 18 for rotation, the centrifuge housing 16 includes a bearing support element which may take the form of a vertically upright support shaft 34 aligned with the predetermined axis 19 of rotation, and upper and lower bearings sets 36, 38. The support shaft 34 includes a larger diameter central portion 34a, and smaller diameter end portions 34b, 34c. The intersection between the larger diameter central portion 34a, and smaller diameter end portions 34b, 34c provides bearing support shoulders which support the inner races of the bearing sets 36, 38 axially. The support shaft 34 also includes a threaded end 34d onto which a nut 40 is fastened to axially secure the shaft 34 to the motor mount assembly 30.

Figure 20:
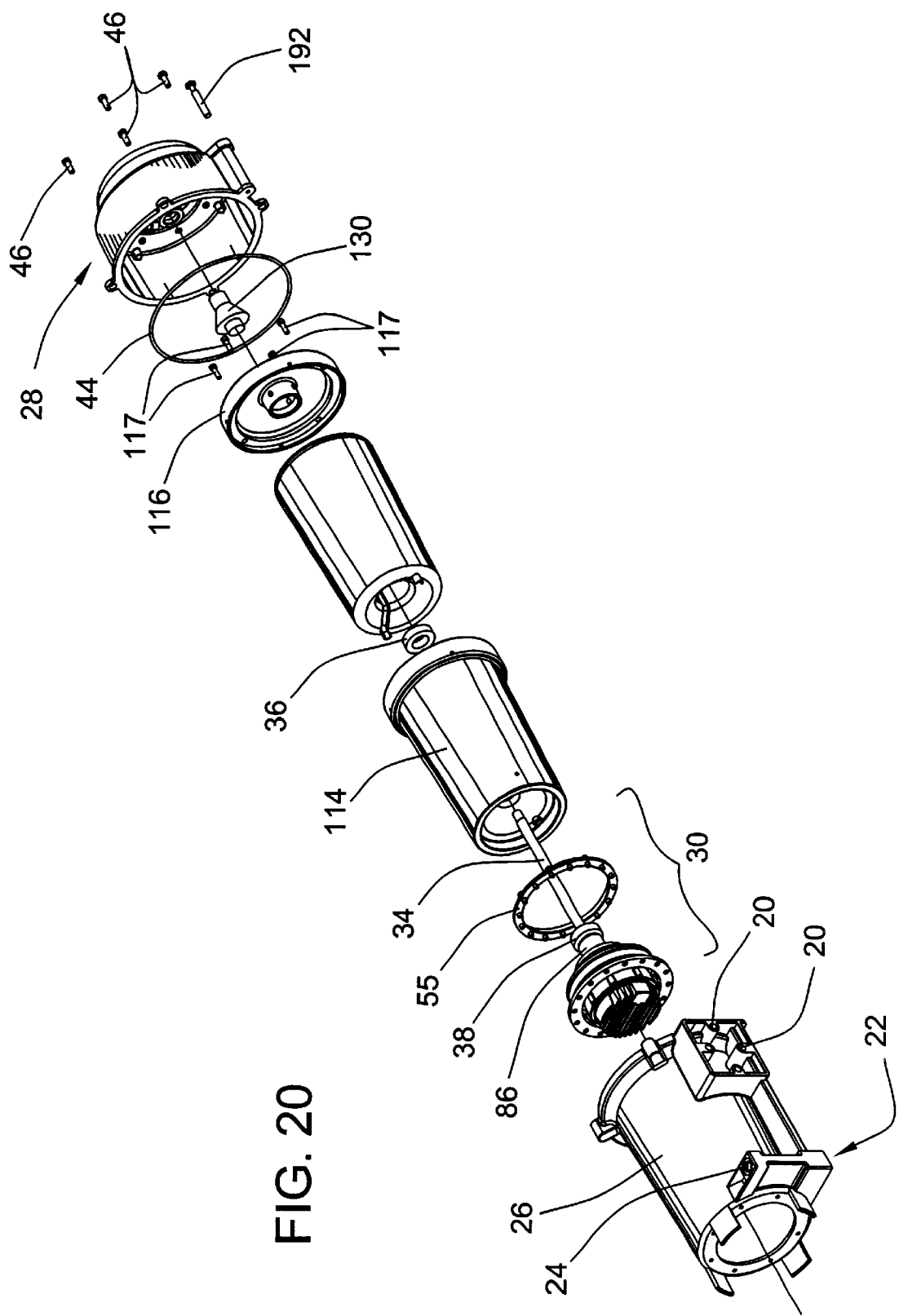
FIG. 20 is an isometric exploded assembly view of the centrifuge assembly for the centrifuge shown in FIG. 1.
Figure 21:
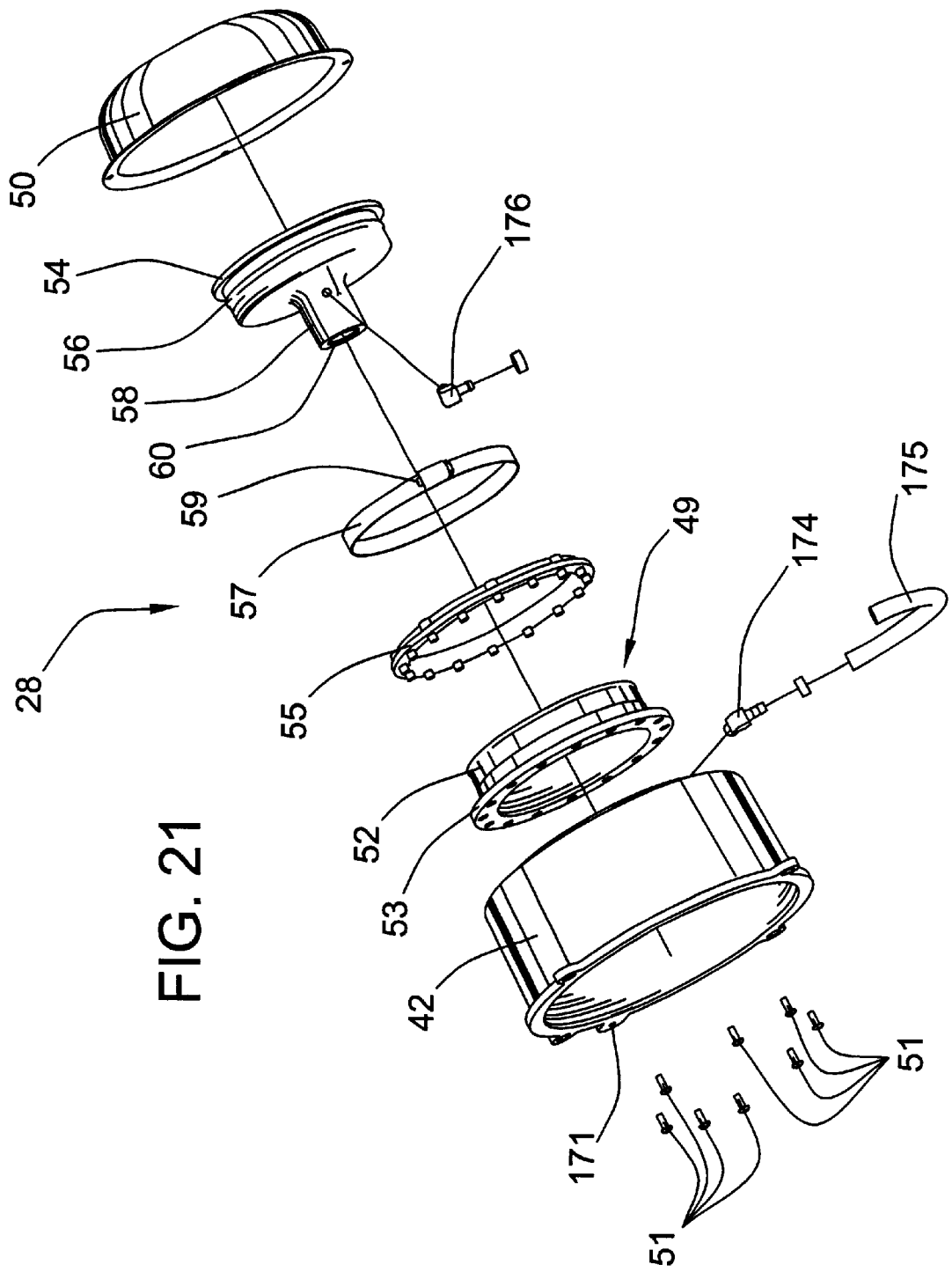
FIG. 21 is an isometric exploded assembly view of the lid assembly for enclosing the top end of the centrifuge housing shown in FIG. 2.
Figure 31:
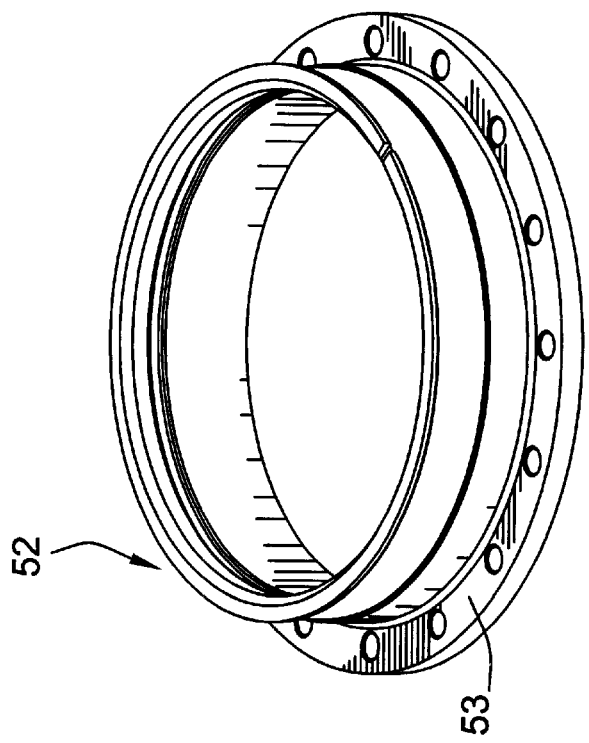
FIGS. 29–31 are top, cross section, and isometric views of a vibration isolator used in the centrifuge housing, respectively.
Figure 29:
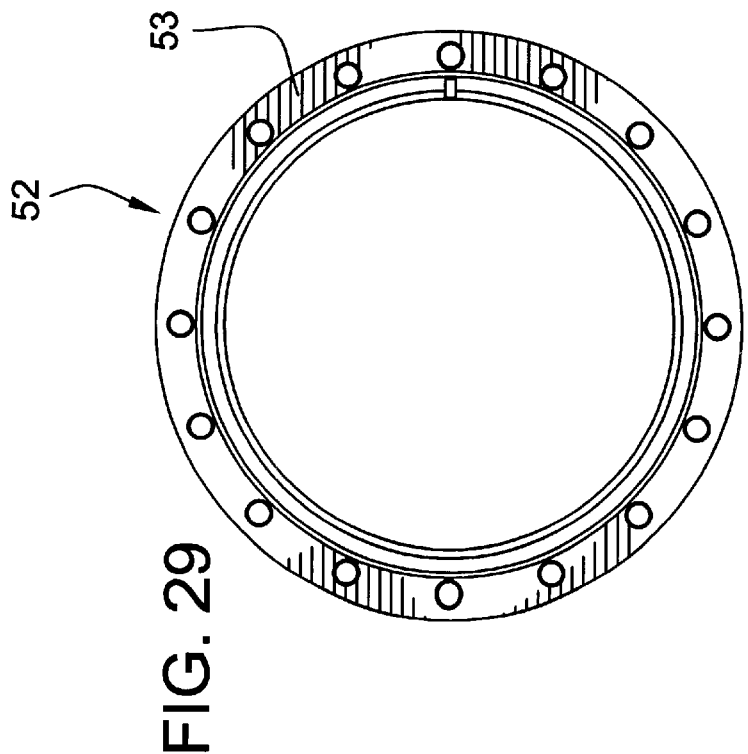
Figure 30:
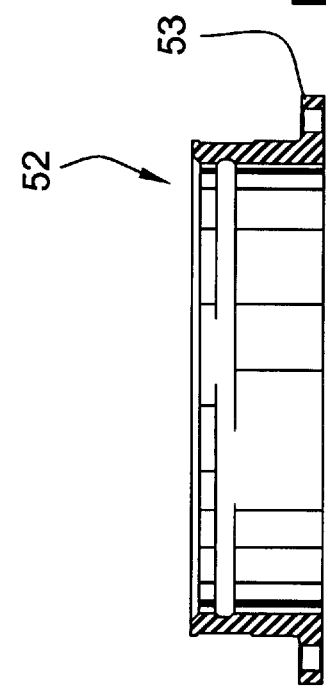

Referring to FIGS. 5 and 21, the lid assembly 28 includes a generally cylindrical to slightly conical lid base 42 formed of die cast aluminum fastened to the support body 26 along mating flanges in a removable manner via threaded shoulder bolts 46 (FIG. 20). An o-ring gasket 44 provides a seal between the mating flanges and serves the purpose of isolating the rotor chamber 32 from the external environment. The top of the lid base 42 includes a radially inward projecting support flange 48 that supports a formed sheet metal lid cover 50 and an upper vibration isolator 49 in the form of a generally cylindrical, resilient, rubber ring 52. The vibration isolator 49 supports a top bracket 54 and therefore ultimately supports the support shaft 34. The rubber ring 52 includes a peripheral flange portion 53 clamped to the support flange 48 (see also FIGS. 29–31). The clamp for the rubber ring includes a retainer ring 55 and screws 51 to provide the clamping force sandwiching the peripheral flange portion 53 between the retainer ring 55 and support flange 48. The top bracket 54 includes a cylinder portion 56 secured to the rubber ring 52 by an expandable and retractable ring shaped metal hose clamp 57 tightened by fastener 59. It is an advantage that the retainer ring 55 and the hose clamp 57 eliminate the need to vulcanize the rubber resilient material to any particular metal part, thereby improving reliability as this configuration eliminates the possibility of metal and rubber separation. Because the rubber ring is clamped all of the way around and includes no apertures when clamped, it also provides a seal, although a ring gasket or other seal could also be provided between the lid cover 50 and lid base 42. The top bracket 54 also includes a central axially extending hub portion 58 defining a cylindrical cavity 60 closely dimensioned to the outer end diameter of the support shaft 34 for radial support of the support shaft 34. The cylindrical cavity 60 slidably receives the top end 34b of the support shaft. The entire lid assembly 28 is removable by unfastening the threaded bolts 46 and pulling the assembly vertically upward to slid the hub portion 58 off of the top end of the support shaft 34.

Figure 22:
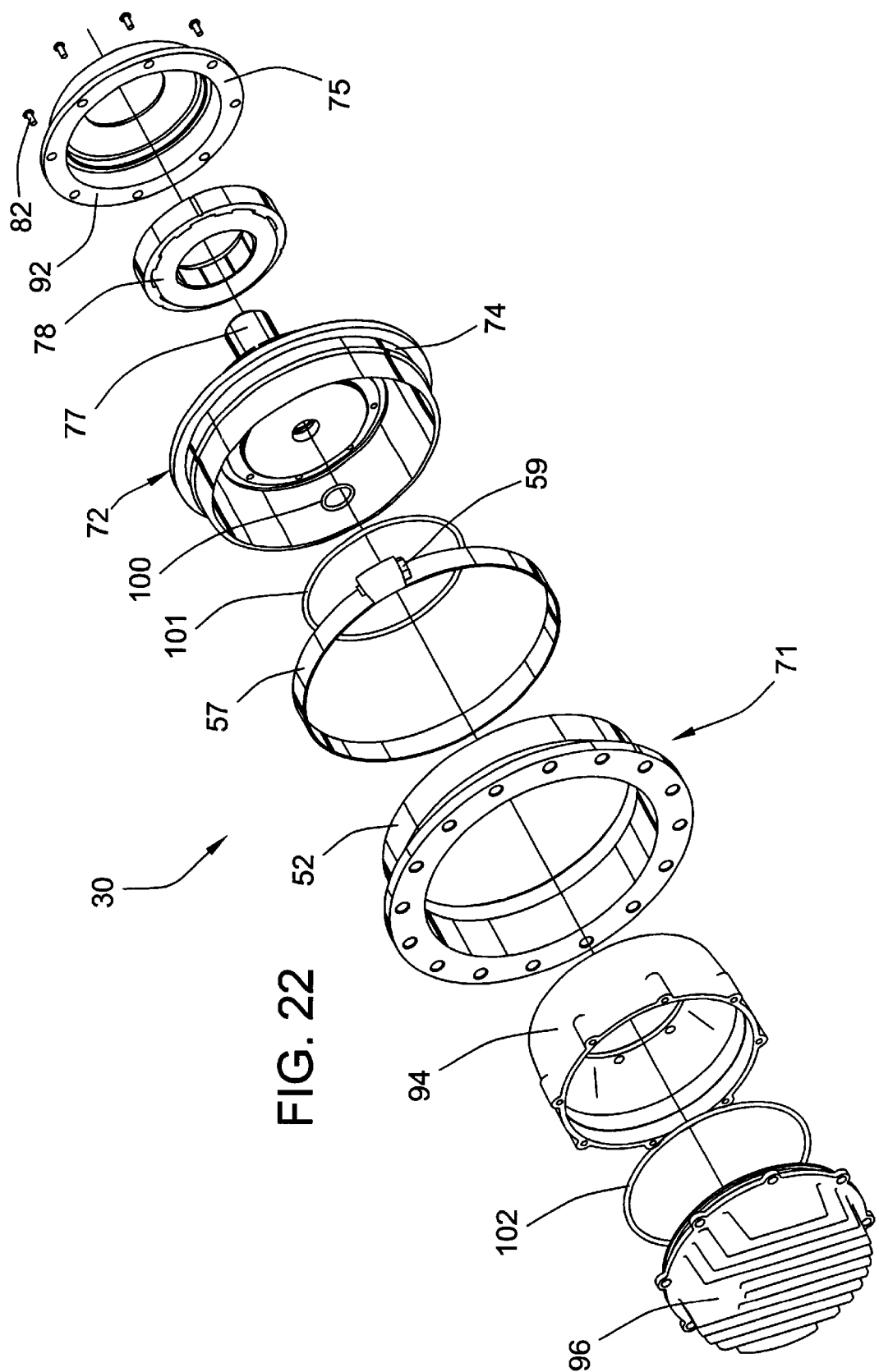
FIG. 22 is an isometric exploded assembly view of the motor mount assembly for enclosing the bottom end of the centrifuge housing shown in FIG. 2.
Figure 23:
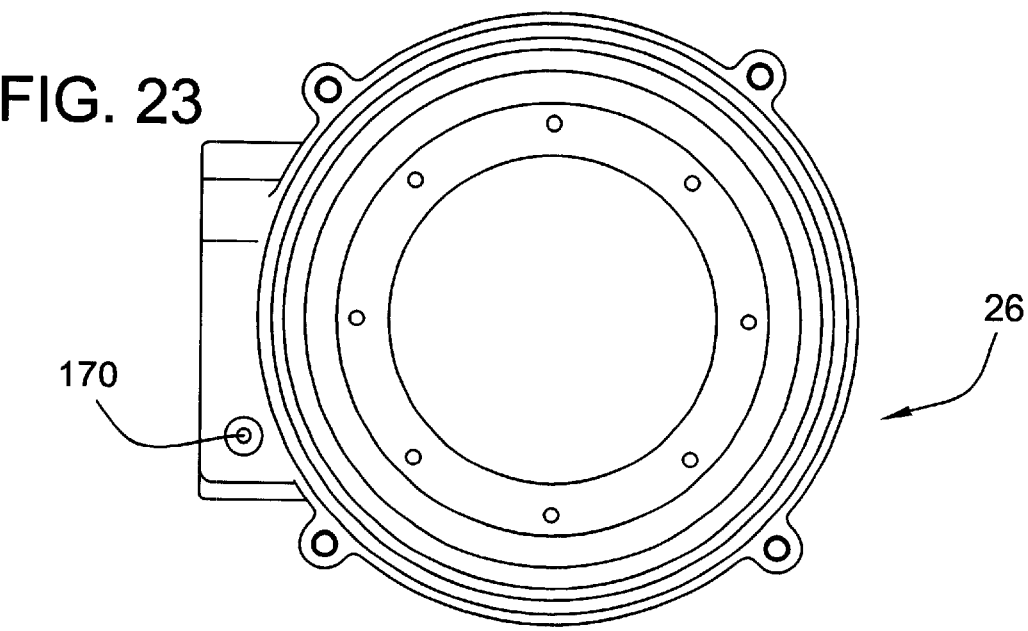
FIG. 23 is a top end view of the primary support body of the centrifuge housing shown in FIG. 2.
Figure 24:
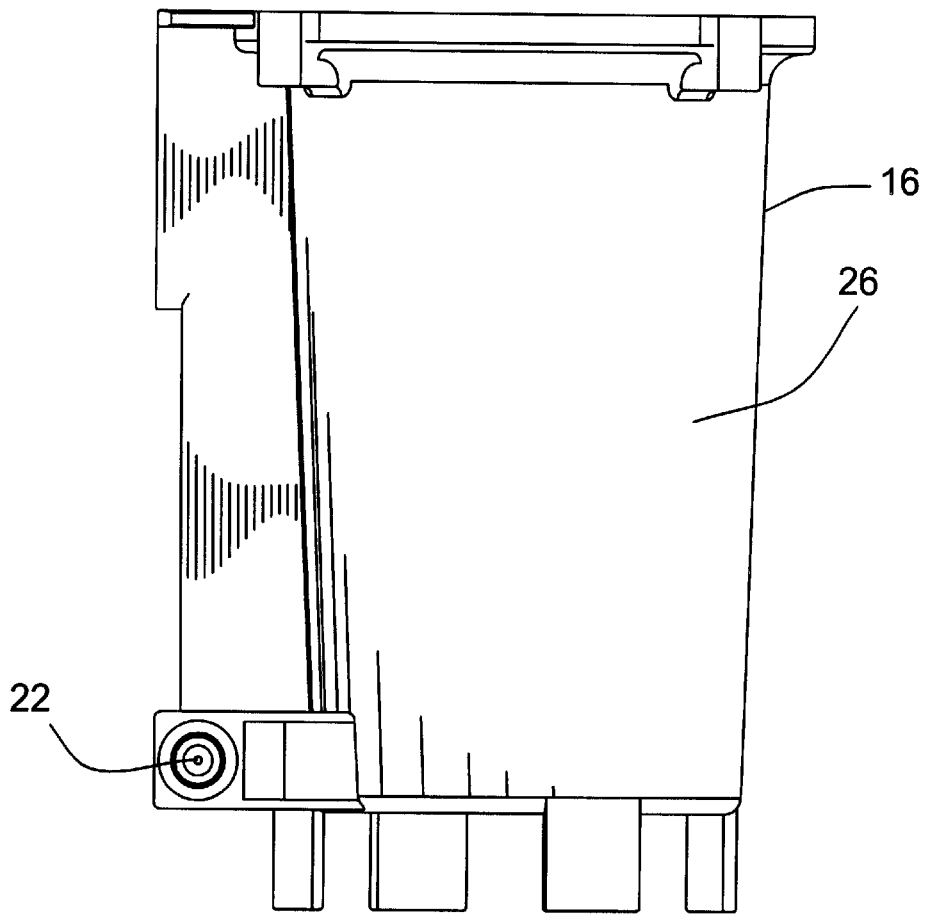
FIG. 24 is a side view of FIG. 23.
Figure 34:
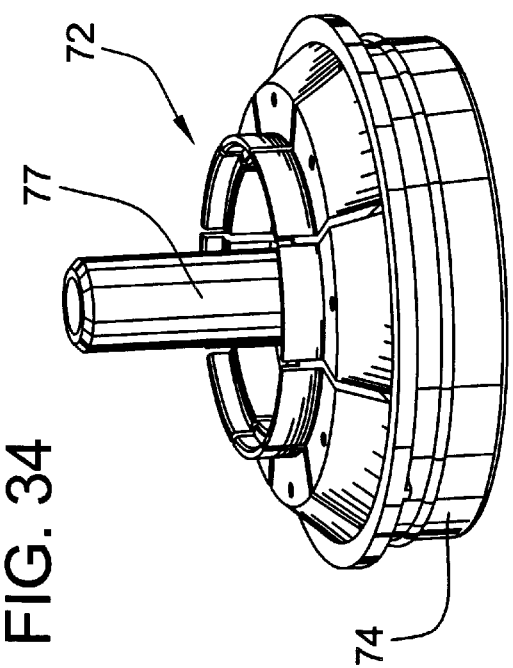
FIGS. 32–34 are top, cross section and isometric views of the motor and shaft mount of the centrifuge housing, respectively.
Figure 32:
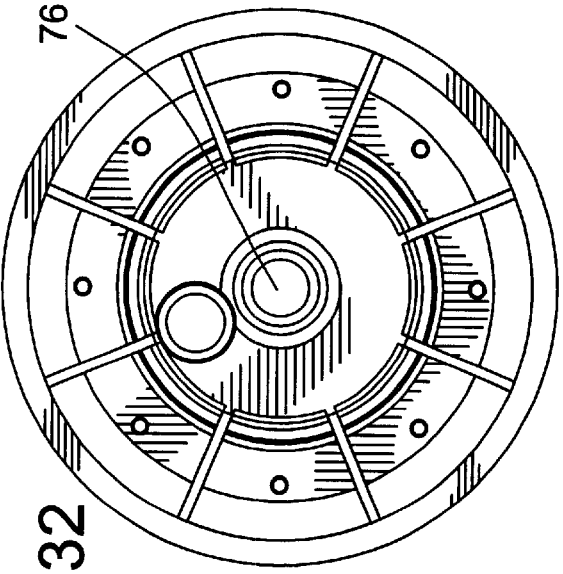
Figure 33:
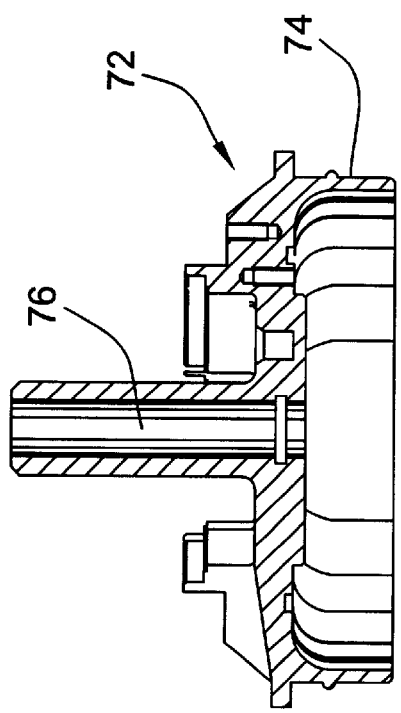

Referring to FIGS. 6 and 22, the motor mount assembly 30 also includes a lower vibration isolator 71 which is identical to that used in the upper lid assembly 28, including a resilient rubber ring 52, a rigid retainer ring 55 and screws 51. In this case, the flange portion 53 of the rubber ring is clamped to a bottom radial lip 70 of the primary support body 26. The rubber ring 52 is also clamped via a hose clamp 57 with a fastener 59 to a rigid motor mount 72 along a cylinder portion 74 of the motor mount 72. Further structural details of the motor mount 72 can be seen with reference to FIGS. 32–34 The motor mount 72 includes an axially extending central hub portion 77 defining a central bore 76. The support shaft 34 extends through and is radially supported by the bore 76. A tightened nut 40 axially retains the threaded end 34d of the support shaft 34 to the motor mount 72. The tip end of the motor mount hub portion 77 axially supports and retains the inner race of the lower bearing set 38.

The motor mount 72 provides the bottom bracket which in combination with a top motor bracket 75 secure the stator of an electric motor 80, namely, the stationary lamination stack 78 (including coils and laminations). The top motor bracket 75 is fastened to the motor mount 72 via screws 82 to hold the lamination stack 78 in an annular or cylindrical recess 84 formed by the joined combination of the motor mount 72 and top motor bracket 75. The electric motor 80 is preferably of the DC brushless type and is powered via the electrical supply of the vehicle. The rotor of the motor 80 comprises a drive sleeve 86 holding a magnet 88. The drive sleeve 86 may be fastened via a threaded connection 90 or otherwise secured to the centrifuge support casing 21. The drive sleeve 86 is concentric about the support shaft 34 and motor mount hub portion 77 with sufficient clearance such that it does not contact or engage the hub portion 77 during rotation. The drive sleeve 86 also extends through a center clearance opening 92 in top motor bracket 75 to include a upper portion that mechanically connects with the support casing 21 and a upper portion that positions the permanent magnet 88 relative to the stator of the motor 80 such that the magnet 88 and drive sleeve 86 are driven and in turn drive the rotor 18.

The bottom side of the motor mount 72 also carries a heat sink including a dissipater plate mount 94 and dissipater plate 96, both of heat conductive metal material for the dissipation of heat from the electric motor and electronics. The combination of the dissipater plate mount 94 and dissipater plate 96 also define an electronics chamber 98 in which the signal conditioning electronics can or may be mounted for driving the electric motor 80. O-ring gaskets 100, 101, 102 are arranged between different pieces of the motor mount assembly 30 to provide a seal and prevent contaminants from entering the electronics chamber 98. The gasket indicated at reference number 100 also serves the purpose of isolating the rotor chamber 32 from the external environment. Like the upper vibration isolator 49, the lower vibration isolator 71 may also be clamped in manner to likewise provide a seal that also serves the purpose of isolating the internal environment of the rotor chamber 32.

Figure 3:
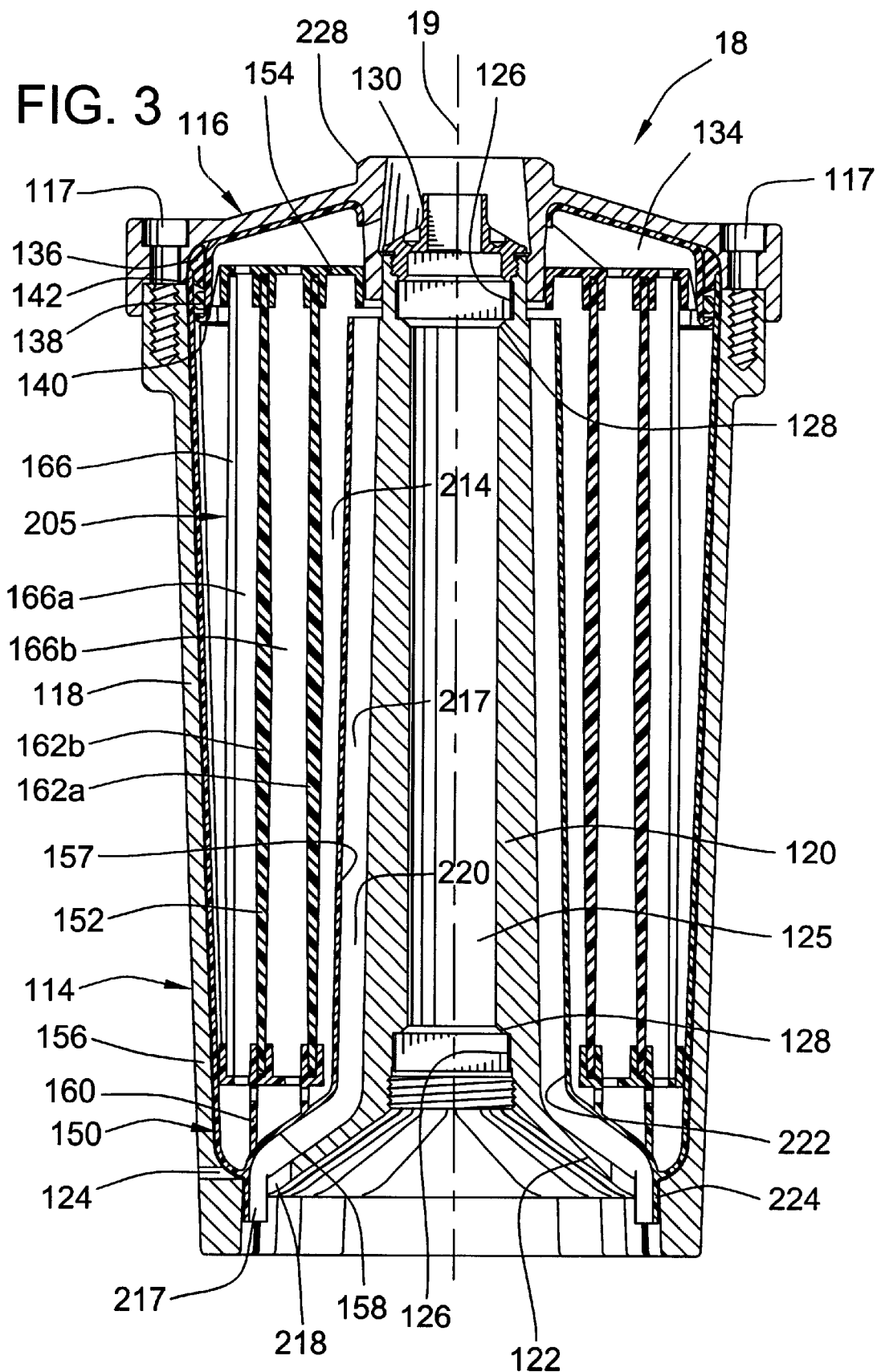
FIG. 3 is a cross section of the rotor as shown in FIG. 1.
Figure 8:
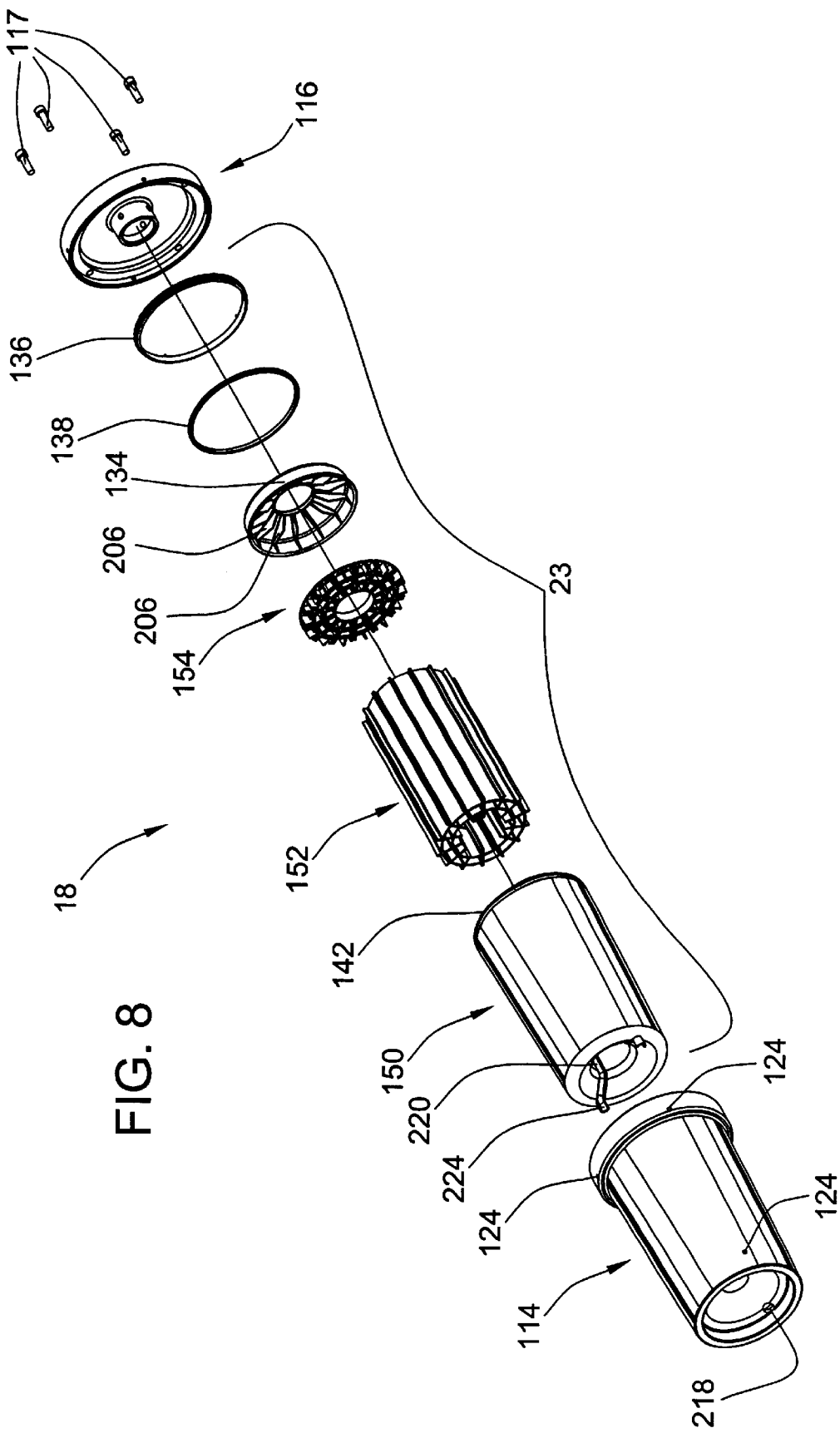
FIG. 8 is an isometric exploded assembly view of the rotor including the centrifuge cartridge casing along with the disposable centrifuge cartridge shown previously in FIGS. 3 and 4.
Figure 11:
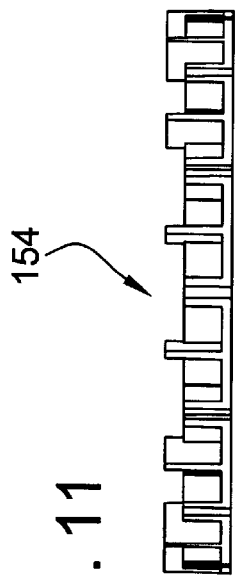
FIGS. 9–13 are bottom, cross section, side, top, and isometric views of the top end cap of the disposable centrifuge cartridge, respectively.
Figure 12:
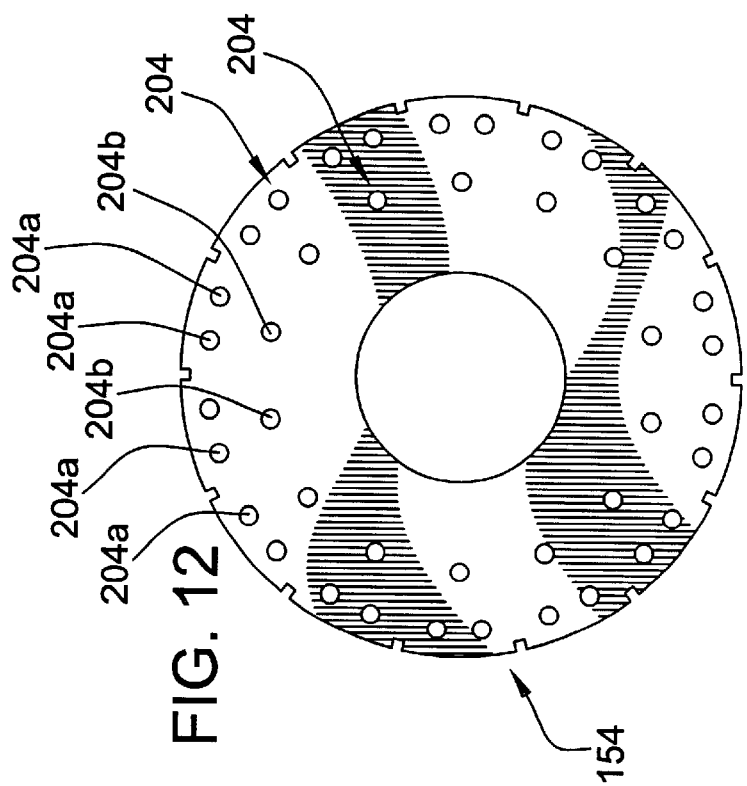
Figure 9:
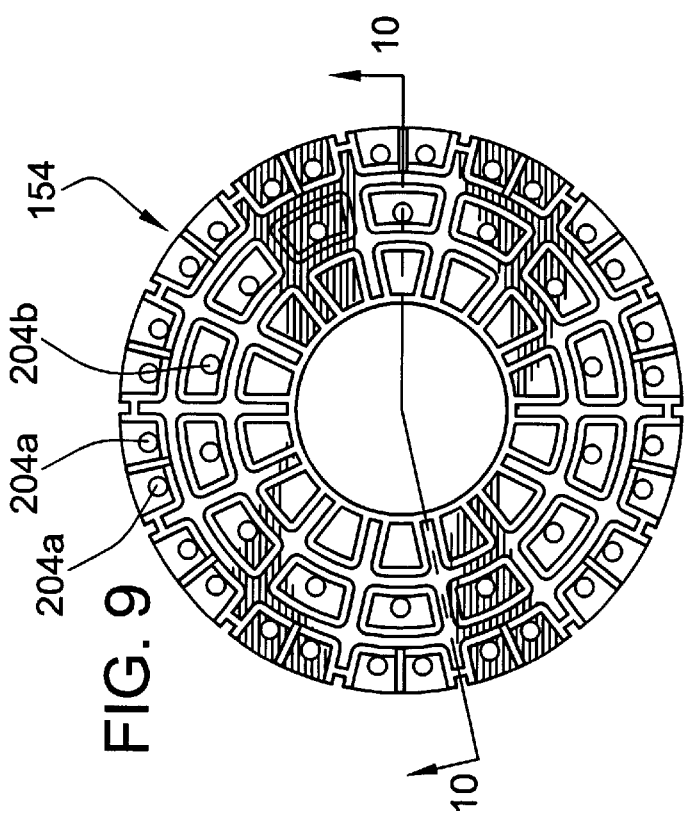
Figure 10:
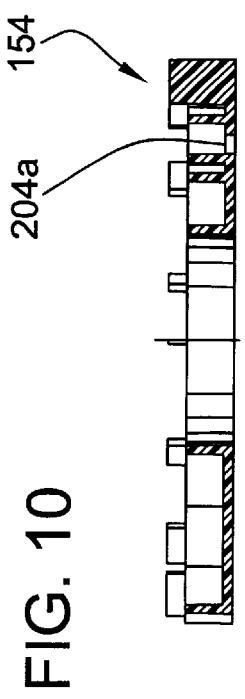
Figure 13:
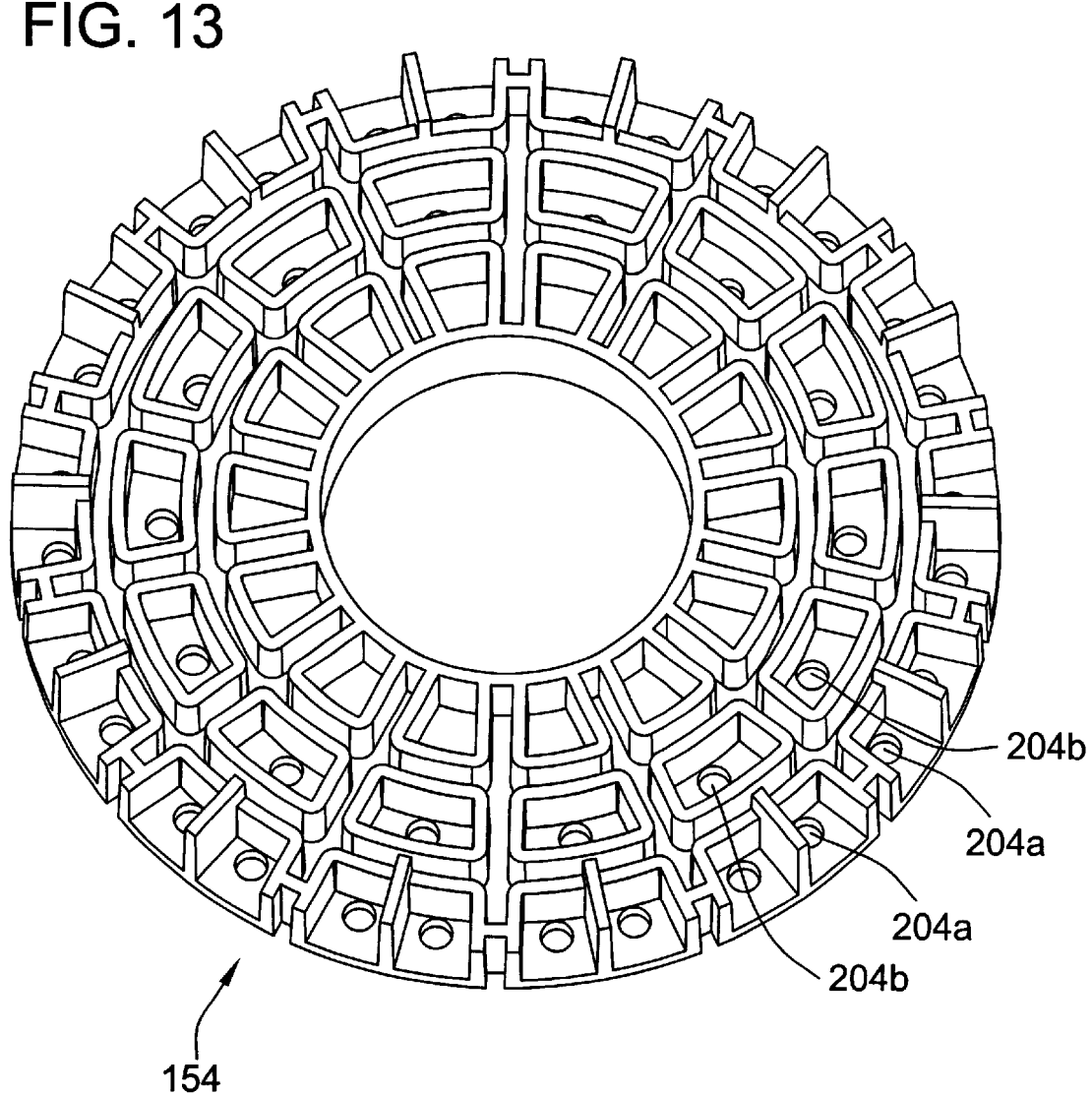
Figure 16:
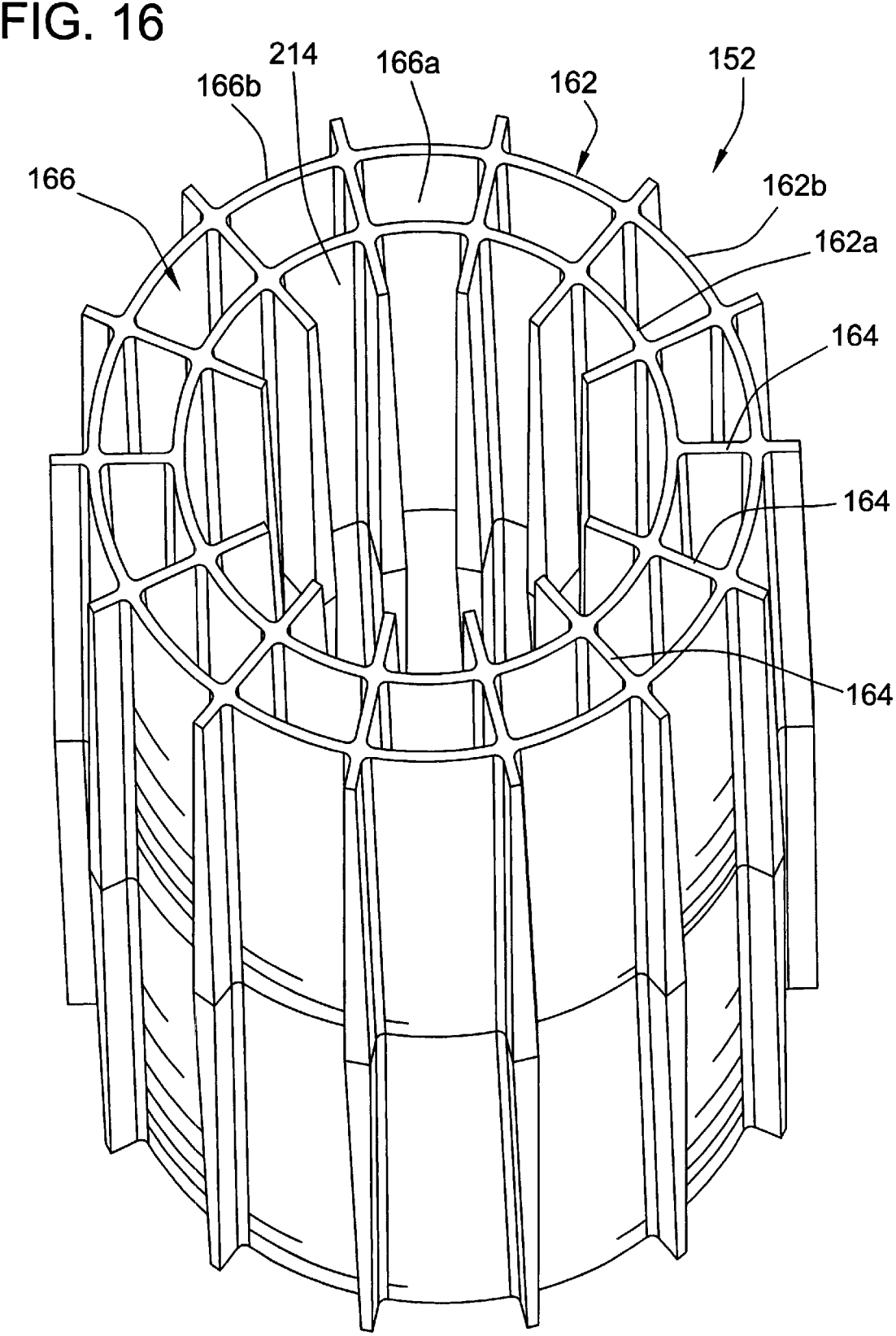
Figure 17:
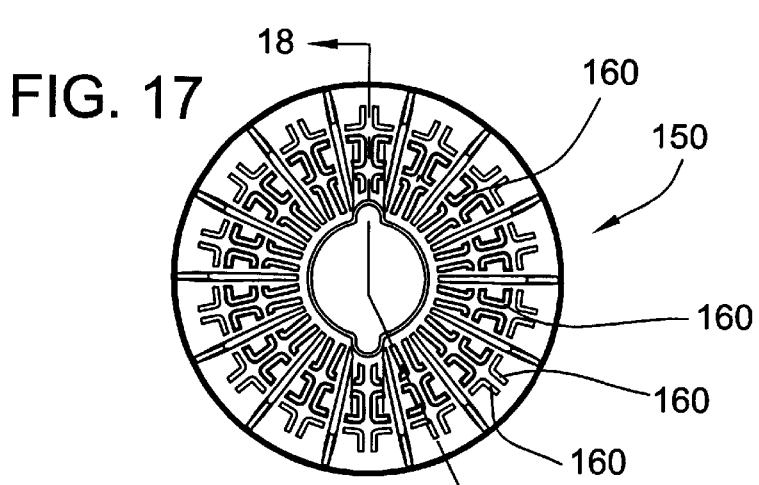
FIGS. 17–19 are top end, cross section, and bottom end views of the cartridge shell of the disposable centrifuge cartridge, respectively.
Figure 18:
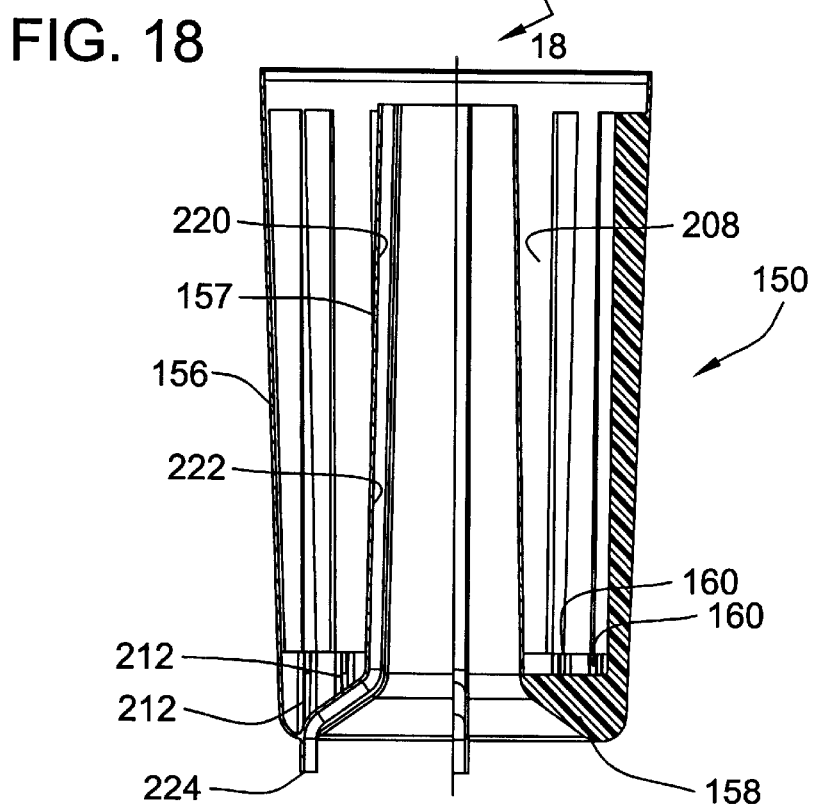
Figure 19:
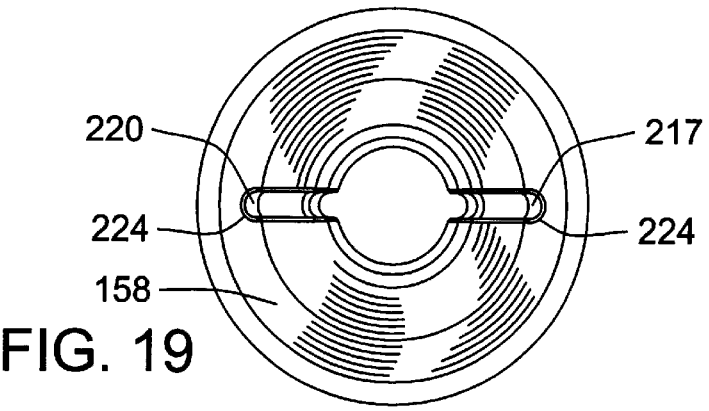

Referring again to FIG. 1, the centrifuge support casing 21 of the rotor 18 is directly supported by the outer races of the upper and lower bearing sets 36, 38. Referring to FIGS. 3 and 8, the centrifuge support casing 21 includes a can or support bowl 114 and a removable lid 116 fastened via threaded shoulder bolts 117 or otherwise secured in a removable manner to the top end of the support bowl 114. The support bowl 114 is substantially permanently mounted in the centrifuge housing 16 such that it is not removed during normal maintenance intervals when the disposable plastic cartridge 23 is replaced. However, it can be removed if necessary. The support bowl 114 is formed of die cast aluminum or other appropriate material of sufficient strength to support the plastic cartridge 23 full of oil during operational rotation. The support bowl 114 includes a generally cylindrical support wall 118 and a central support tube 120 integrally joined by cup shaped annular base portion 122. It should be noted the outer support wall 118 has a slight draft on it to facilitate easy sliding of the cartridge 23 into and out of the casing 21. At this point it will be understood that the term "generally cylindrical" as used herein is intended a broad meaning and throughout this disclosure is meant to include such slight drafts, conical and other similar elongated annular configurations. The support bowl 114 also includes pressure relief/drain holes 124 at strategic locations to prevent installation difficulties or improper installation due to pressure differentials that would otherwise be caused by the close fit between the support bowl 114 and the plastic cartridge 23 during insertion and removal of the plastic cartridge 23. The holes 124 also allow oil to drain to prevent particles from collecting on the inner wall of the support bowl 114.

The central support tube 120 has a larger inner diameter than the outer diameter of the stationary support shaft 34 so as not to contact that stationary element during rotation. The central support tube 120 has a central bore 125 for receiving the shaft 34 and recessed sections 126 on its inner periphery upon which the outer races of the upper and lower bearing sets 36, 38. The shoulders 128 at the inside edge of the recessed sections 126 serve to axially retain the rotor 18. A flow diverter 130 is screwed into the center support tube 120 at its top end and engages the upper bearing set 36 to also axially retain the rotor 18. The magnet holder or drive sleeve 86 is threaded into the center support tube 120 or otherwise fixed thereto at its lower end and engages the lower bearing set 38 also for axial retention purposes.

Figure 4:
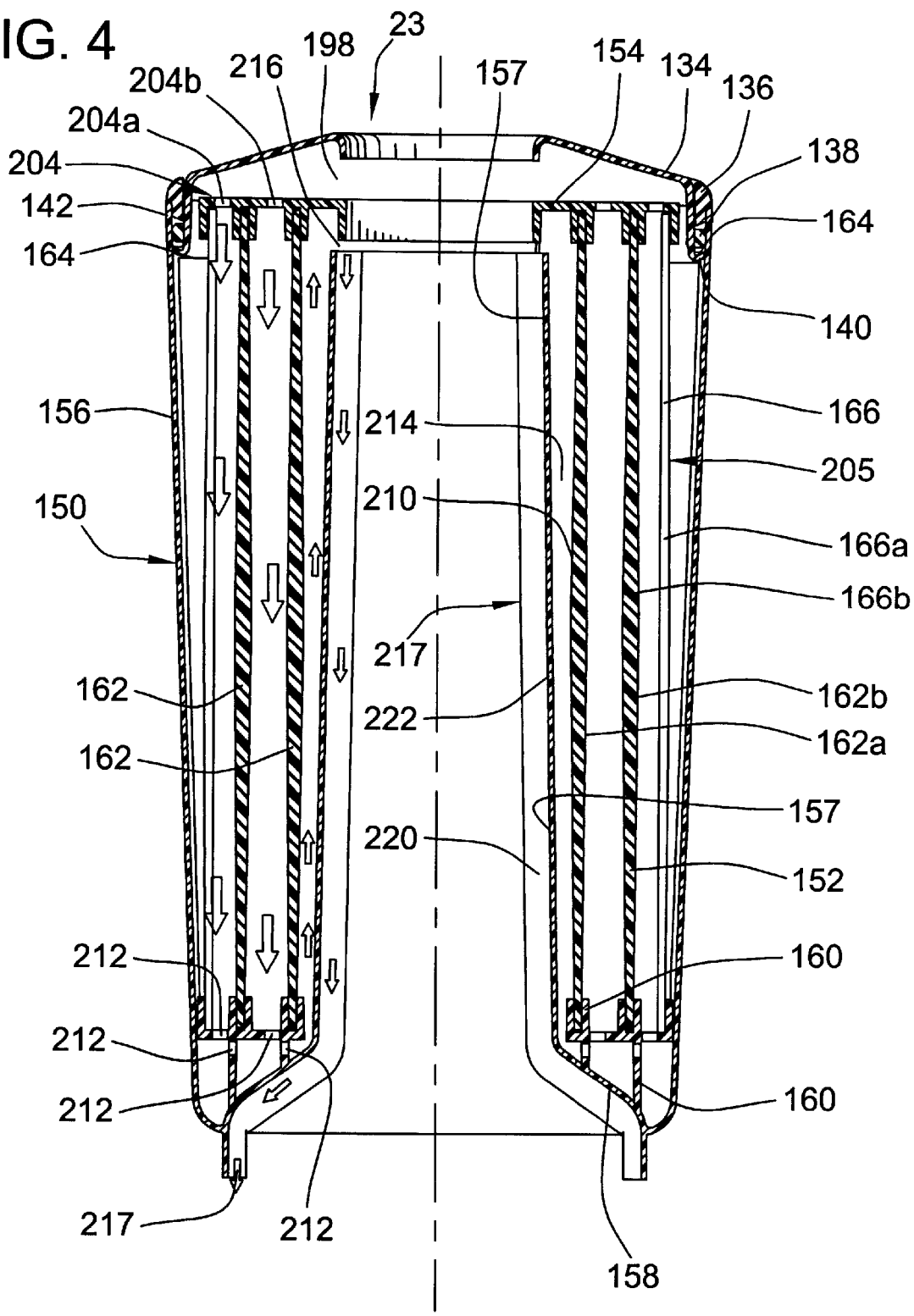
FIG. 4 is a cross section of the disposable and replaceable centrifuge cartridge shown in FIG. 2 with arrows indicating flow paths through the cartridge.
Figure 7:
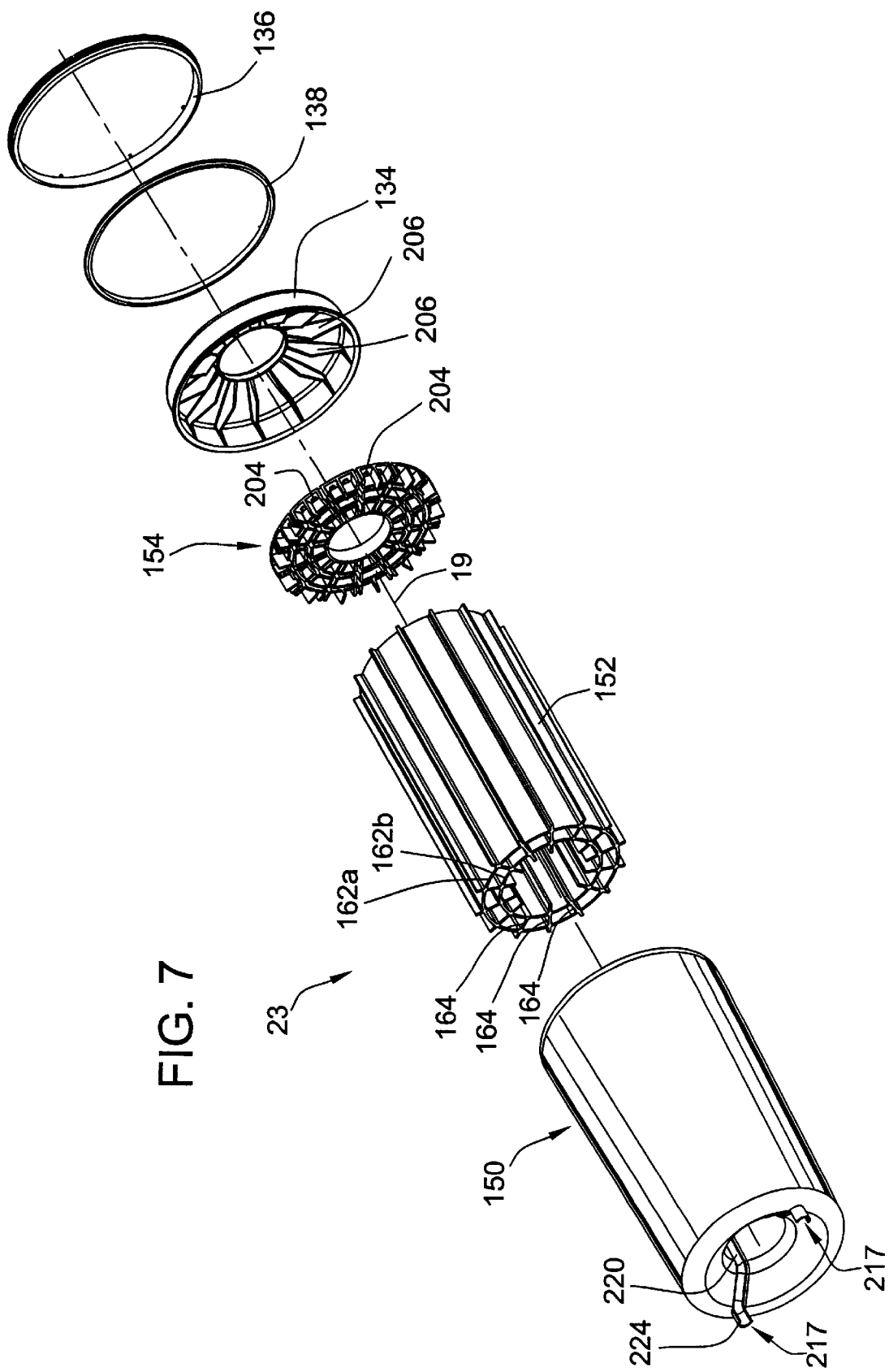
FIG. 7 is an isometric exploded assembly view of the disposable centrifuge cartridge shown previously in FIG. 4.

Turning now to FIGS. 4, 7 (and FIGS. 9–19 for certain individual components), attention will be had to the disposable plastic cartridge 23 which is periodically replaced. Although a structurally plastic cartridge 23 is desired for purposes of easy and inexpensive manufacture, disposal and incineration, it will be appreciated that the cartridge 23 could also be formed of other materials such sheet metal or die cast aluminum of a combination of metal and plastic materials if desired. In the preferred embodiment, the plastic cartridge 23 is comprised of five separate plastic components secured together including a bowl liner or cup shaped shell 150, a trap 152 and a top end cap 154, a weld ring 136 and a lid 134 that includes flow dividing fins 206. The cartridge 23 also may include a radial seal gasket 138 which eliminates the need to seal the outer metal support casing 21.

The plastic shell 150 of the cartridge 23 includes a generally cylindrical outer wall 156 closely dimensioned in diameter and configured to the inner peripheral surface of the outer support wall 118 of the cartridge support casing 21. The shell 1 50 also includes a generally cylindrical inner wall 157 generally concentric inside of the outer wall 156. The inner wall 157 is integrally joined to the outer wall 156 through a bottom end 158 (which is also closely configured to the inside surface of the support base portion 122). In this manner, the cup shaped shell 150 is adapted to hold oil or other liquid for filtering between outer and inner walls 156, 157. A matrix of axially projecting retaining ribs 160 are formed into the bottom end 158 (similar ribs are formed into the top end cap). The retaining ribs 160 are adapted to engage and mechanically secure the trap 152 at the bottom end of the cartridge 23.

At the top end, the trap 152 may be glued or potted into the top end cap 154 to ensure that oil must travel to the bottom of the trap 152. Referring to the trap 152 in greater detail, it can be seen that it may include at least one and preferably two or more generally cylindrical partition walls 162 coaxial about the central predetermined axis 19 and a plurality of radial partition walls 164 extending radially inward toward the predetermined axis and through the cylindrical partition walls 162. The cylindrical and radial partition walls 162, 164 serve the purpose of preventing wave formation as will be described in further detail below and divide the interior of the centrifuge cartridge element into separate sections or flow channels 166.

The top end of the cartridge 23 is enclosed by a lid 134. The lid 134 has a central opening to provide clearance for the support shaft 34 and to allow entrance of oil through annular cartridge inlet 198. The top surface of the cartridge lid 134 is closely configured to the bottom surface of the removable lid 116 so that there large surface area contact between the two during operation so that the plastic material of the plastic lid 134 is supported by the metal material in the removable lid 116. A weld ring 136 is spun weld onto the top edge of the plastic shell 150 forming a melted plastic bond therebetween. The weld ring 136 retains the lid 134 axially to the rest of the cartridge 23 but allows the lid to slide a bit axially and allow for axial expansion of the cartridge 23 during operation. The lid 134 carries a radial seal gasket 138 via hooked lip portion 140 that seals against an inner free edge 142 of the plastic shell 150. The lid 134 may also include partition fins 206 which serve to divide oil entering the annular cartridge inlet 198 and support the top end cap 150.

Now that details of the structure of the centrifuge 10 has been had for a working understanding, detail will now be directed toward how oil enters, flows through and exits the centrifuge 10. Particular reference can be had to FIGS. 5, 21, 23, 24, 25, 26, 27, 28, and 28a. As previously indicated, the housing 16 receives oil from the engine through the external inlet port 22 on the support body 26. The oil travels through an inlet conduit into the filter housing and is feed into the centrifuge cartridge through a side oil outlet 168 provided by the top bracket 54 at a point offset from the predetermined axis 19 of rotation, such that oil need not flow through the support shaft 34. To convey the fluid to the side oil outlet 168, the connecting conduit in preferred embodiment includes an axially extending passage 170 in the support body 26, an axially extending passage 171 in the lid base 42, a radially inward extending passage 172 in the lid base 42, a hose fitting 174 securely fastened to the lid base 42, a flexible hose 175 connecting the hose fitting 174 to a hose fitting 176 that is securely fastened to the top bracket 54, and intersecting radially inward and axial passages 177 in the top bracket 54.

It is an aspect of the present invention according to a preferred embodiment that inlet conduit includes a metering device or restriction in the form of a restriction plug 190 that controls the flow rate and reduces the pressure of oil entering the rotor 18, as is shown in FIGS. 5, 27, 28 and 28a. In the preferred embodiment the restriction plug 190 takes the form of a threaded bolt 192 that is threaded into oversized threads of a hole 194 tapped into the lid base 42 along its axial passage 171. This provides a restriction orifice in the form of a helical restriction passage 196 having a flow area smaller than the either the side oil outlet 168 or the inlet port 22. The effect of the restriction passage 196 is to restrict the oil and primarily to control the flow rate of oil into the rotor 18 and secondarily to reduce its pressure at the side oil outlet 168. Another feature using a threaded bolt 192 as the restriction plug is that it is modular and can be easily changed or adapted to match the bolt 192 to the particular application due to differences in oil pressures from the various types and sizes of engines and oil pumps in the marketplace. In particular, this matching is accomplished during initial assembly once the desired application is known by selecting the bolt 192 from a plurality of bolts having different radial threading depths or sizes to thereby select the effect flow area of the helical restriction passage 196 matched to oil system pressure. By controlling the flow rate of oil into the rotor 18, an effective residence time for oil inside the centrifuge cartridge can be set to optimize the ability of the centrifuge 10 to separate soot from oil. It has been found that current residence times of about 8 to 10 minutes are desirable for soot removal applications. Although shorter times may be possible if centrifugal force is increased.

It is another aspect of the present invention according to a preferred embodiment that the side oil outlet 168 feeds oil into the centrifuge cartridge at a distance offset from the predetermined axis 19 through an annular inlet 198 in the top end of the cartridge 23. The annular inlet 198 is coaxial about the predetermined axis and positioned underneath the side oil outlet so that the oil is received into the centrifuge cartridge at all angular positions of the cartridge 18. The side oil outlet 168 is also not physically connected or in contact with the centrifuge cartridge such that the side oil outlet 168 is exposed and there is no resistance to oil flowing into the rotor 18 from the spinning oil in the rotor 18. Flow through the annular inlet 198 eliminates the need for flow passages through the support shaft 34 thereby greatly simplifying construction of the housing.

It is another aspect that the vibration isolators 49, 71 serve the function of reducing the effect of engine vibrations and vehicle induced shock loads on the rotating element in the centrifuge housing 16 and likewise vibrations from the rotor 18 to the vehicle. The vibration isolators 49, 71 are made of resilient rubber material in a preferred embodiment and allow for relative radial and light axial movement between the rotor 18 and the centrifuge housing 16. Importantly, the vibration isolators carry the bearing support element which takes the form of the support shaft 34 to ensure that these impact loads are not applied to the upper and lower bearing sets 36, 38. This has the advantage of vastly improving reliability and life span of these bearing sets 36, 38 and therefore the centrifuge 10. The lower vibration isolator 71 also carries the electric motor 80 and associated electronics which also improves reliability and lifespan of the centrifuge 10. The flexible hose 175 allows for relative movement between the top bracket 54 and the lid base 42 while maintaining the oil connection or path to the side oil outlet 168. To ensure that the rotating cartridge 18 does not contact any fixed component or crash against the inside surface of the outer support body 26, the allowed movement of the upper and lower vibration isolators 49, 71 are snubbed by mechanical stops. These mechanical stops are provided by the inside surfaces 202 of the retaining rings which are conical. The inside surface 202 for the top vibration isolator 49 engages the rigid outer periphery of the rigid top bracket 54 (through the intermediate rubber ring 52) to limit radial movement of the top bracket and elements supported thereby. Likewise, the inside surface 202 for the lower vibration isolator 49 engages the outer periphery of the rigid motor mount 72 (again through the intermediate rubber ring 52) to limit radial movement of the motor mount and elements supported thereby.

It is a further aspect of the present invention according to a preferred embodiment that the side oil outlet 168 is movable relative to the support body 26 through the provision of the upper and lower vibration isolators 49, 71. Because the top bracket 54 is mounted in the top vibration isolator 49 for supporting the rotor 18, the top bracket 54 and the centrifuge housing 18 move in unison relative to the support body 26 that may be caused by engine vibrations and vehicle induced shock loads. This arrangement assures proper alignment between the side oil outlet 168 and the annular inlet 198 so that there is no spillage of oil to the exterior of the cartridge 18.

Once the oil has entered the rotor 18 it is spun radially outward through centrifugal force and enters the disposable plastic cartridge 23 through the plastic lid 134 (between fins 206) and enters the filtering chamber 205 through entrance ports 204 in the top end cap 154. The flow diverter 130 has a conical top face which initially guides the oil radially outwardly and prevents oil from washing away the initial grease packing of the upper bearing set 36. The outer ring of entrance ports 204a feeds unfiltered oil into the outer flow channels 164b, while the inner ring of entrance ports 204b feeds unfiltered oil into the internal filter chamber 205 of the cartridge 23, and specifically, the inner flow channels 164a. It is anticipated that over time, agglomerated soot will completely fill up the outer flow channels 164b at which time only the inner circle of entrance ports 204b and inner flow channels 166a continue to be operative.

To ensure oil is more evenly divided between each of the flow channels 166, the flow divider lid 134 includes partition fins 206. Oil contained between adjacent fins 206 is directed into one of the flow channels 166. During rotation, oil is forced to flow vertically and axially downward via separate flow channels 166 toward the bottom end 158 of the centrifuge cartridge. Referring again to FIGS. 4 and 5, the flow channels 166 are divided into outer flow channels 166b between outer wall 156 and the outer cylindrical partition wall 162b and inner flow channels 166a between the outer cylindrical partition wall 162b and the inner cylindrical partition wall 162a of the trap. Heavy particles such as fine soot in the oil will migrate radially outward via the centrifugal force. Soot will tend to agglomerate along the inner peripheral surfaces of the outer wall 156 and the cylindrical partition walls 162 which provide soot deposit areas. Centrifugal force is greater at larger diameters and therefore soot will migrate radially outward as far as possible. In contrast to the heavier soot particles that migrate radially outward, the lighter clean oil flows radially inward through port openings 212 in the retaining ribs 160 in the bottom end 158. The cleaner oil then enters a return flow passage 214 formed between the inner cylindrical partition wall 162a and the shell inner wall 157. Cleaner oil flows axially in the opposite direction or vertically upward toward an exit 216 where clean oil leaves the filter chamber 205. The exit 216 is simply a gap provided between the shell 150 and the top end cap 154. Soot may continue to separate out of the oil and be trapped in the filter chamber 205 at any point prior to the exit 216 (although centrifugal forces are greater at larger diameters). Importantly, the oil exit 216 is located radially inwardly of the annular inlet 198 such that oil does not back up and flow out the annular inlet 198 due to the centrifugal force. The oil exit 216 is also located proximate the top end of the centrifuge cartridge 23 such that all or substantially all (preferably greater than about 90%) of the oil remains in the filter chamber 205 once rotation stops, such that soot or unclean oil does not inadvertently drain from the filter chamber 205.

Once oil reaches the reaches the oil exit 216 it then flows back axially or vertically downward along an outlet conduit formed between the inside surface 222 of the cartridge 23 and the central support tube 120 toward outlet ports 218 through the bottom end of the rotor 18. Preferably, oil is routed through two outlet conduits 217 for balancing purposes formed by an axially extending groove or channel 220 formed into the inner peripheral surface of the shell 150. The channel 220 has a slight draft on it expanding radially outwardly from top to bottom to ensure that centrifugal force guides the oil toward the outlet port 218. The cartridge 23 also includes tabs 224 which fit through the outlet ports 218 for location purposes and to also assist in torque transfer, locking the centrifuge element 23 to the support casing 21 to ensure no slippage therebetween. Once oil exits the rotor 18 it is guided through gravity and collected in an annular trough 226 formed at the bottom of the centrifuge housing 16 for removal and,return. It is an advantage that oil enters the cartridge through the top end of the rotor 18 and exits through the bottom end or otherwise in proximity to the bottom end of rotor 18. In this manner, there is no oil drag induced during rotation of the cartridge 18 other than the unfiltered oil initially entering the cartridge 18.

It is a feature of the winding flow path arrangement through the filter chamber 205 that unfiltered oil cannot short circuit to the filter chamber exit 216. According to the preferred embodiment, oil flows all the way from the top end of the filter chamber 205 back to the bottom end of the filter chamber 205 and then back to the top end of the filter chamber 205. The gluing or potting of the trap 152 to the top end cap 154 also ensures that leakage does not occur along the contact surface between the top end cap 154 and the top end of the trap 152. Also, by using the inside surface of the shell 150 and specifically the concave depressions which provide axial channels 220 in the cartridge which in combination with interior surface of the support bowl 114 serve as outlet conduits 217, no seals, separate tube or pipe assemblies, or extra passageways are required to route the exiting clean oil to the bottom end of the cartridge 18 to be expelled therefrom. This greatly simplifies the configuration of the trap 152 and disposable cartridge 23.

It is another aspect of the centrifuge cartridge 23 that partition walls 162, 164 are provided to prevent and reduce waves from forming in the spinning oil inside the filter chamber 205. The partition walls 162, 164 break the filtering chamber into separate sections each extending axially from top end to bottom end. By inhibiting wave formation, the partition walls 162, 164 maintain a more balanced rotor 18 about the predetermined axis 19 of rotation. This reduces the loads and resulting wear imposed on the upper and lower bearing sets 36, 38 and on the components electrical motor 80. Improved reliability and life span of the centrifuge 10 is achieved as a result.

The disposable cartridge 23 in this unit may be completely plastic and without any metal due to the support of the outer support casing 21 which is reused. The cartridge 23 traps the soot from the oil such that when the cartridge element is disposed of the soot is likewise disposed of as well. Making the disposable element out of plastic makes it much less expensive to manufacture and also makes it capable of being incinerated. In accomplishing these advantages, it has been found useful to back the plastic disposable cartridge 23 up with metal structural components of the support bowl 114 and lid 116 due to the fact that high temperatures of engine oil and pressures due to centrifugal force are too high to expect the plastic to hold up. As such, the cartridge element is 23 configured closely to the interior chamber of the support casing 21 such that centrifugal force causes engagement between the outer support wall 118 and the outer peripheral surface of the disposable cartridge 23. During maintenance intervals, the housing lid assembly 28 is removed by unfastening the external shoulder bolts 46. The lid assembly 28 slides right off the support shaft 34 without any need to disconnect any oil connections. Then, the cartridge bolts 117 are unfastened and the cartridge lid 116 is removed to gain access to the disposable cartridge 23 filled in part with the trapped soot. The lid 116 includes a hex 228 which can be gripped with a wrench to hold the cartridge 18 stationary during unfastening of the bolts 117. The disposable cartridge 23 is then pulled out through the top of the support bowl 114 for disposable and replacement with a new clean cartridge 23 which is inserted into the support bowl. The lid 116 is then replaced and refastened on the support bowl 114 to secure the cartridge 23 in the outer support casing 21. It is an advantage that this service maintenance is performed from the top of the centrifuge 10 which allows a mechanic to work over the top of the vehicle rather than having to get down underneath the vehicle.

Once the filtered oil is collected in the annular trough 226, it then exits the centrifuge housing 16 through a horizontal outlet passage 230 that is connected to the housing outlet port 24 for return to the engine oil sump or pan as can be seen in FIGS. 2 and 25. Although gravity could be used in returning the filtered oil, it is a feature that a venturi conduit 232 is provided that carries away the filtered oil from horizontal outlet passage 230. The venturi conduit 232 is arranged between the inlet port 22 and the outlet port 24 and comprises a larger diameter upstream section 234, a large diameter downstream section 236, a restriction orifice 238 having the smallest diameter or flow area, and a gradually expanding conical section 240 to connect the restriction orifice 238 to the downstream section 236. The outlet passage 230 is-connected downstream of the front edge or entrance of the restriction orifice 238 such that it is subjected to a vacuum or suction effect. The restriction orifice 238 also serves the purpose of maintaining high pressure in the larger diameter upstream section 234 which feeds unfiltered oil vertically upward along the axial passage 170 of the centrifuge housing 16.

The venturi conduit 232 serves an additional important function in the preferred embodiment that provides yet another novel aspect of the present invention. In particular, the rotor chamber 32 has been carefully and intentionally sealed to provide an isolated atmosphere or environment in which the rotor 18 rotates. Gaskets or other seals or other sealing means such as using resins, epoxies or materials which can effect a substantially air tight seal between two separate metal components are used to effect this isolated atmosphere. In the preferred embodiment, gaskets, or other rubber or resilient materials designated at reference numbers 44, 52, and 100, all help to maintain an isolated environment. With the environment isolated from the external atmosphere outside of the centrifuge 10, the venturi effect caused via the continuous flow of oil through the venturi conduit 232 serve to suck the air out of the rotor chamber 32 and provide a partial vacuum of less than ½ atmosphere. A partial vacuum of ⅓ of an atmosphere or less has been achieved using the approach of the preferred embodiment. The benefit of the partial vacuum is that air drag on the rotating rotor 18 is greatly reduced allowing the cartridge to more easily achieve the desired speed. This reduces the electrical powering requirements and the necessary size of the brushless DC electrical motor 80 which is a big advantage due to the fact that the centrifuge 10 in the preferred embodiment is electrically powered by the vehicle or engine, thereby to minimize or prevent undue electrical power drain. It has been found that a desirable speed to achieve is about 13,000 revolutions per minute which effect a centrifugal force of about 10,000 times the force of gravity, which is sufficient to remove the very small particulate soot from oil (this coupled with a long residence time mentioned above). However, it will be appreciated that the force and speed can be altered a certain extent based on cartridge diameter and residence time of oil in the cartridge during operation. The partial vacuum achieved allows the rotor 18 to get up to speed using the electrical power on most over the road commercial vehicles. It should be noted that in the alternative, the centrifuge 10 could also be driven by compressed air system, mechanically by the engine, or via an oil driven turbine. Using any means of driving, the reduce atmosphere provides a huge advantage of power savings. Compressed air or other means could also be used as a means to effect the venturi effect or otherwise provide a partial vacuum in the rotor chamber.

A further feature of the present invention is use of a load washer 250 or wave spring mechanism as shown in FIG. 35 which serves to bias the upper bearing set 36 (and therefore the rotor 18) vertically upward which balances the axial loads across the pair of bearing sets 36, 38. In particular, the wave spring 36 axially preloads the upper bearing set 36 which counteracts the weight of the cartridge 18 when full of oil. As shown, the load of 20 lbs. is carried equally by upper and lower bearing sets 36, 38 in FIG. 35 which improves lifespan and reliability by reducing bearing stress. The following equations describe how the load is carried and how the spring force can be set:

$$F_{R1}+F_{R2}=F_R \text{ and } F_{R2}=F_R-F_{R1}$$

$$F_{R1}=F_s$$

$$F_{R2}=F_b$$

Where $F_R$=Total gravitational force of rotor;

$F_{R1}$=Gravitational force of rotor applied to upper bearing set;

$F_{R2}$=Gravitational force of rotor applied to lower bearing set;

$F_S$=Force of spring washer.

$F_B$=Supporting force by motor mounting bracket

By setting the force of the spring equal to one half the gravitational force of the rotor, the load is equally carried over both bearing sets 36, 38.

Figure 36:
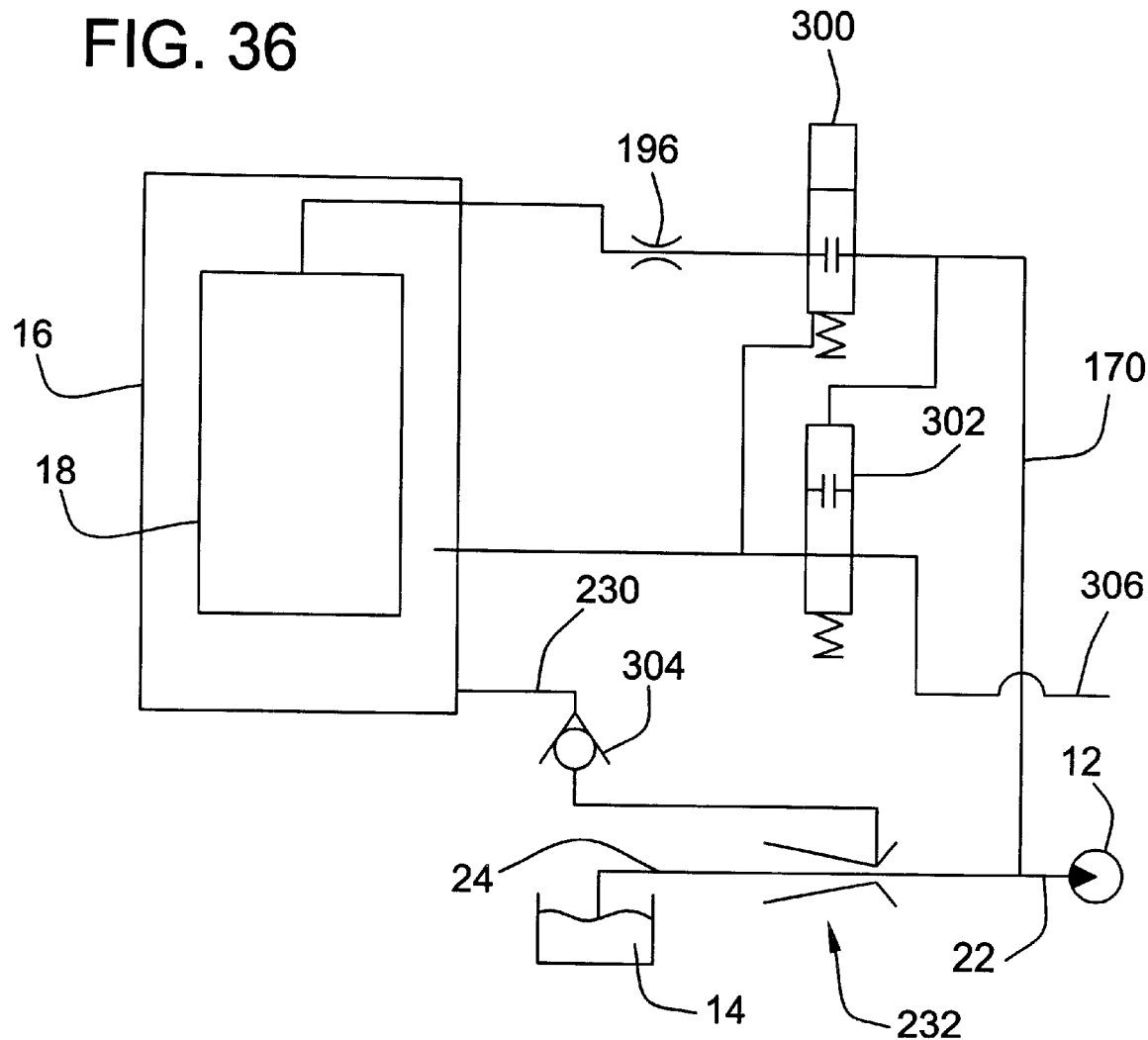
FIG. 36 is a schematic view of valving that may be used with the centrifuge to control venting and partial vacuum of the rotor chamber.

Turning to FIG. 36, it will be appreciated that a preferred embodiment of the present invention may also include a valve system to control the partial vacuum condition in the rotor chamber during operation. These valves may be directly mounted on the centrifuge housing 16. In operation, oil from the engine pump 12 enters through the inlet port 22, passes through the venturi conduit 232 and exits the outlet port 24 in route to the engine oil sump 14. A check valve 304 arranged in conduit 230 prevents oil from flowing in the reverse direction which could fill or flood the housing 16. When the oil temperature is elevated, the venturi conduit 232 begins aspirating thus opening the check valve 304 and evacuating air from the centrifuge housing 16.

The system may include a pressure relief valve 302 fluidically connected to the rotor chamber of the housing 16 that vents the rotor chamber to the external atmosphere 306 so that the rotor chamber returns to atmospheric pressure at engine shut down. The pressure relief valve 302 is piloted by and responsive to the engine oil pressure in line 170. When the engine is operating, the oil pressure in line 170 shuts the pressure relief valve 306 allowing a partial vacuum to form inside the housing 16 and reduce air drag on the rotor 18. However when the engine is shut down, the oil pressure drops in line 170 thereby opening the rotor chamber of the housing 16 to the external atmosphere through the pressure relief valve 302. This returns the internal rotor chamber of the housing 16 back to normal atmospheric pressure, which also allows a mechanic or vehicle operator to easily open the housing 16 and also prevents the vacuum from sucking oil from the engine oil circuit into the housing 16 and rotor 18.

The system may also include a oil flow shut off valve 300 that prevents oil flow into the rotor 18 until a partial vacuum forms in the housing 16 at which point the rotor 18 is up to the desired speed. The shut off valve 300 is piloted by and responsive to the air pressure inside the housing 16. The shut off valve 300 is closed until a partial vacuum of a predetermined magnitude is reached in the housing 16. When a partial vacuum in the centrifuge housing 16 is formed, the valve 300 opens allowing oil to flow through the restriction passage 196 and into the rotor 18. The valves 300, 302 may be in the form of diaphragm type valves and can be located or mounted to the outside of the housing 16. The valves 300, 302 may also be integral to the housing. The ports 22, 24 and the venturi may also be external and integral to the housing 16 as well. The check vlave 304 can be internal, and integral to the housing 16. These valves also eliminate the need for any electronic controlled valves.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In an engine of a vehicle, a centrifuge housing supporting a centrifuge rotor for rotation about a predetermined axis for removal of soot from engine oil, the centrifuge housing comprising:

a drive mechanism external to the centrifuge rotor mechanically coupled to the centrifuge rotor for driving the centrifuge rotor about the predetermined axis;

a sealed centrifuge rotor chamber providing an isolated environment in which the centrifuge rotor is supported for rotation;

an inlet port connected to the engine to receive oil;

an outlet port connected to the engine to return oil to the engine;

a venturi conduit interposed between the inlet port and the outlet port, having operatively larger and smaller flow capacity passage portions adapted to create a low pressure region, the isolated atmosphere fluidically connected to the venturi conduit wherein the low pressure region creates a partial vacuum in the isolated environment of the sealed centrifuge rotor chamber for reduced air drag on the centrifuge rotor during rotation;

a housing body having an open end and a removable lid, a seal disposed between the removable lid and the housing body to maintain the isolated environment, the housing body including a mount adapted to be mounted to a vehicle, the centrifuge rotor being serviced through the open end via removal of the lid;

an inlet conduit deriving a portion of the oil flow from the inlet port for filtering, the inlet conduit including an unfiltered oil outlet feeding unfiltered oil into the centrifuge rotor; and a restriction interposed along the inlet conduit controlling the flow rate of unfiltered oil through the unfiltered oil outlet, the restriction being provided by a plug selected from a plurality of plugs, each plug providing a restriction having a different effect on the pressure and flow rate of oil into the centrifuge rotor, the size of the restriction being selected to provide a residence time for oil in the centrifuge rotor that is sufficiently long enough to facilitate removal of soot from oil.

2. The centrifuge housing of claim 1 further comprising a housing body having an open end and a removable lid, a seal disposed between the removable lid and the housing body to maintain the isolated environment, the housing body including a mount adapted to be mounted to a vehicle, the centrifuge rotor being serviced through the open end via removal of the lid.

3. The centrifuge housing of claim 2 wherein the inlet port, the outlet port and venturi conduit are integrally provided by the housing body.

4. The centrifuge housing of claim 2 further comprising an inlet conduit deriving a portion of the oil flow from the inlet port for filtering, the inlet conduit including an unfiltered oil outlet feeding unfiltered oil into the centrifuge rotor.

5. The centrifuge housing of claim 4 further comprising a restriction interposed along the inlet conduit controlling the flow rate of unfiltered oil through the unfiltered oil outlet.

6. The centrifuge housing of claim 5 wherein the restriction is provided by a plug selected from a plurality of plugs, each plug providing a restriction having a different effect on the pressure and flow rate of oil into the centrifuge rotor the size of the restriction being selected to provide a residence time for oil in the centrifuge rotor that is sufficiently long enough to facilitate removal of soot from oil.

7. The centrifuge housing of claim 1 further comprising an electrical motor mounted to the centrifuge housing adapted to be powered by the vehicle to which the centrifuge housing is mounted, the electrical motor driving the centrifuge rotor about the predetermined axis at a speed sufficient to remove soot from oil, the partial vacuum allowing the centrifuge rotor to arrive at said speed.

8. The centrifuge housing of claim 1 wherein the low pressure region of the venturi conduit is adapted to provide a pressure in the isolated environment that is at least less than 0.5 atmospheric pressure.

9. The centrifuge housing of claim 1 further comprising a trough in the centrifuge housing adapted to collect filtered oil outputted by the centrifuge rotor, the housing body defining an outlet passage connecting the trough with the venturi conduit, wherein filtered oil is removed along with air from the isolated environment via suction through the outlet passage.

10. The centrifuge housing of claim 9 further comprising a check Valve arranged along the outlet passage preventing oil from flowing from the venturi passage into the isolated environment.

11. The centrifuge housing of claim 1 further comprising an oil shut off valve controlling oil flow into the centrifuge rotor, wherein the oil shut off valve has an open position allowing oil flow into the centrifuge rotor when a partial vacuum is established in the isolated environment and a closed position when the isolated environment is at atmospheric pressure.

12. The centrifuge housing of claim 11 wherein the oil shut off valve is responsive to and piloted by the air pressure in the isolated environment.

13. The centrifuge housing of claim 1 further comprising a venting valve having an open position connecting the isolated environment to the external atmosphere when the engine is off and a closed position disconnecting the isolated environment from the external atmosphere when the engine is on.

14. The centrifuge housing of claim 13 wherein the venting valve is biased to the open position and piloted by the engine oil pressure from the inlet port.

15. In an engine of a vehicle, a centrifuge housing supporting a centrifuge rotor for rotation about a predetermined axis for removal of soot from engine oil, the centrifuge housing comprising:
   a drive mechanism external to the centrifuge rotor mechanically coupled to the centrifuge rotor for driving the centrifuge rotor about the predetermined axis;
   a sealed centrifuge rotor chamber in which the centrifuge rotor is supported for rotation;
   an inlet port for receiving unfiltered oil from the engine;
   an outlet port for returning oil to the engine;
   an inlet conduit from the inlet port communicating unfiltered fluid into the centrifuge rotor for centrifugal filtering;
   a venturi conduit connecting the inlet port to the outlet port bypassing the centrifuge rotor, including a first passage merging into a downstream second passage, the second passage having a larger flow capacity than the first passage creating a low pressure region;
   a filtered oil outlet passage for evacuating filtered oil from the centrifuge rotor, the filtered oil outlet passage intersecting the venturi conduit proximate the intersection between the upstream and downstream passages, wherein the low pressure region evacuates filtered oil and creates a partial vacuum in the isolated atmosphere of the sealed centrifuge rotor chamber for reduced air drag on the centrifuge rotor; and
   a restriction interposed along the inlet conduit controlling the flow rate of unfiltered oil through the unfiltered oil outlet, the restriction being provided by a plug selected from a plurality of plugs, each plug providing a restriction having a different effect on the pressure and flow rate of oil into the centrifuge rotor, the size of the restriction being selected to provide a residence time for oil in the centrifuge rotor that is sufficiently long enough to facilitate removal of soot from oil.

16. The centrifuge housing of claim 15 further comprising a housing body having an open end and a removable lid, a seal disposed between the removable lid and the housing body, the housing body including a mount adapted to be mounted to a vehicle, the centrifuge rotor being serviced through the open end via removal of the lid.

17. The centrifuge housing of claim 16 wherein the inlet port, the outlet port and venturi conduit are integrally provided by the housing body.

18. The centrifuge housing of claim 15 further comprising a restriction interposed along the inlet conduit controlling the flow rate of unfiltered oil through the unfiltered oil outlet.

19. The centrifuge housing of claim 18 wherein the restriction is provided by a plug selected from a plurality of plugs, each plug providing a restriction having a different effect on the pressure and flow rate of oil into the centrifuge rotor the size of the restriction being selected to provide a residence time for oil in the centrifuge rotor that is sufficiently long enough to facilitate removal of soot from oil.

20. The centrifuge housing of claim 15 further comprising an electrical motor mounted to the centrifuge housing adapted to be powered by the vehicle to which the centrifuge housing is mounted, the electrical motor driving the centrifuge rotor about the predetermined axis at a speed sufficient to remove soot from oil, the partial vacuum allowing the centrifuge rotor to arrive at said speed.

21. The centrifuge housing of claim 15 wherein the suction of the venturi conduit is adapted to provide a pressure in the isolated environment that is at least less than 0.5 atmospheric pressure.

22. The centrifuge housing of claim 15 further comprising a trough in the centrifuge housing adapted to collect filtered oil outputted by the centrifuge rotor, the housing body defining the outlet passage connecting the trough with the venturi conduit, wherein filtered oil is removed along with air from the isolated environment via suction through the outlet passage.

23. The centrifuge housing of claim 22 further comprising a check valve arranged along the outlet passage preventing oil from flowing from the venturi passage into the isolated environment.

24. The centrifuge housing of claim 15 further comprising an oil shut off valve controlling oil flow into the centrifuge rotor, wherein the oil shut off valve has an open position allowing oil flow into the centrifuge rotor when a partial vacuum is established in the isolated environment and a closed position when the isolated environment is at atmospheric pressure.

25. The centrifuge housing of claim 24 wherein the oil shut off valve is responsive and piloted by the air pressure in the isolated environment.

26. The centrifuge housing of claim 15 further comprising a venting valve having an open position connecting the isolated environment to the external atmosphere when the engine is off and a closed position disconnecting the isolated environment from the external atmosphere when the engine is on.

27. The centrifuge housing of claim 26 wherein the venting valve is biased to the open position and piloted by the engine oil pressure from the inlet port.

* * * * *

UNITED STATES PATENT AND TRADEMARK OFFICE
CERTIFICATE OF CORRECTION

PATENT NO. : 6,579,218 B1
DATED : June 17, 2003
INVENTOR(S) : David F. May et al.

It is certified that error appears in the above-identified patent and that said Letters Patent is hereby corrected as shown below:

Column 7,
Line 20, after "shell" delete "1 50" and substitute -- 150 -- therefor.

Column 9,
Line 4, after "and" delete "light" and substitute -- slight -- therefor.

Column 14, line 14 thru Column 15, line 43,
Please delete claims 2-14 therefor.

Column 16, line 18 thru Column 18, line 4,
Please delete claims 16-27 therefor.

Signed and Sealed this

Fifth Day of July, 2005

JON W. DUDAS
*Director of the United States Patent and Trademark Office*